US007590991B2

(12) United States Patent
Arad et al.

(10) Patent No.: US 7,590,991 B2
(45) Date of Patent: Sep. 15, 2009

(54) METHOD AND APPARATUS FOR DETERMINING CHANNEL TO WHICH A TV OR VCR IS TUNED

(75) Inventors: Oren Arad, Palo Alto, CA (US); Selim Shlomo Rakib, Cupertino, CA (US)

(73) Assignee: Terayon Communication Systems, Inc., Santa Clara, CA (US)

( * ) Notice: Subject to any disclaimer, the term of this patent is extended or adjusted under 35 U.S.C. 154(b) by 1072 days.

(21) Appl. No.: 10/684,182

(22) Filed: Oct. 9, 2003

(65) Prior Publication Data
US 2005/0081245 A1 Apr. 14, 2005

(51) Int. Cl.
*H04N 7/16* (2006.01)
*H04B 1/26* (2006.01)
*H04B 17/00* (2006.01)

(52) U.S. Cl. .............................. 725/15; 725/21; 725/19; 725/14; 455/226.2; 455/226.3; 455/184.1

(58) Field of Classification Search ....................... None
See application file for complete search history.

(56) References Cited
U.S. PATENT DOCUMENTS

| | | | | |
|---|---|---|---|---|
| 4,388,644 A * | 6/1983 | Ishman et al. ................. 725/17 |
| 4,605,958 A * | 8/1986 | Machnik et al. ............... 725/14 |
| 4,885,632 A * | 12/1989 | Mabey et al. .................. 725/20 |
| 5,404,161 A * | 4/1995 | Douglass et al. .............. 725/15 |
| 5,481,294 A * | 1/1996 | Thomas et al. ................ 725/20 |
| 5,495,282 A * | 2/1996 | Mostafa et al. ................ 725/21 |
| 5,857,003 A * | 1/1999 | Geiger et al. ................. 375/319 |
| 6,052,807 A * | 4/2000 | Nygaard, Jr. ................. 714/724 |
| 6,124,877 A * | 9/2000 | Schmidt ....................... 725/10 |
| 6,130,726 A * | 10/2000 | Darbee et al. ............... 348/734 |
| 6,208,799 B1 * | 3/2001 | Marsh et al. .................. 386/83 |
| 6,513,161 B2 * | 1/2003 | Wheeler et al. ............... 725/14 |
| 6,523,175 B1 * | 2/2003 | Chan ........................... 725/15 |
| 7,421,723 B2 * | 9/2008 | Harkness et al. .............. 725/14 |

* cited by examiner

*Primary Examiner*—Vivek Srivastava
*Assistant Examiner*—Jun Fei Zhong
(74) *Attorney, Agent, or Firm*—Larry T. Cullen

(57) ABSTRACT

Method and apparatus to determine the channel to which a TV tuner is tuned from a return loss ratio measurement circuit in a set top decoder. The method comprises generating a plurality of probe signals having frequencies spread throughput the TV channel band, preferably using harmonics of a zero order hold D/A converter. The return loss ratio of the reflected probe signals is then determined and stored as a signature for the TV channel and the signatures can subsequently be used along with new return loss ratio measurements to determine the TV channel to which a TV or VCR tuner is tuned.

22 Claims, 15 Drawing Sheets

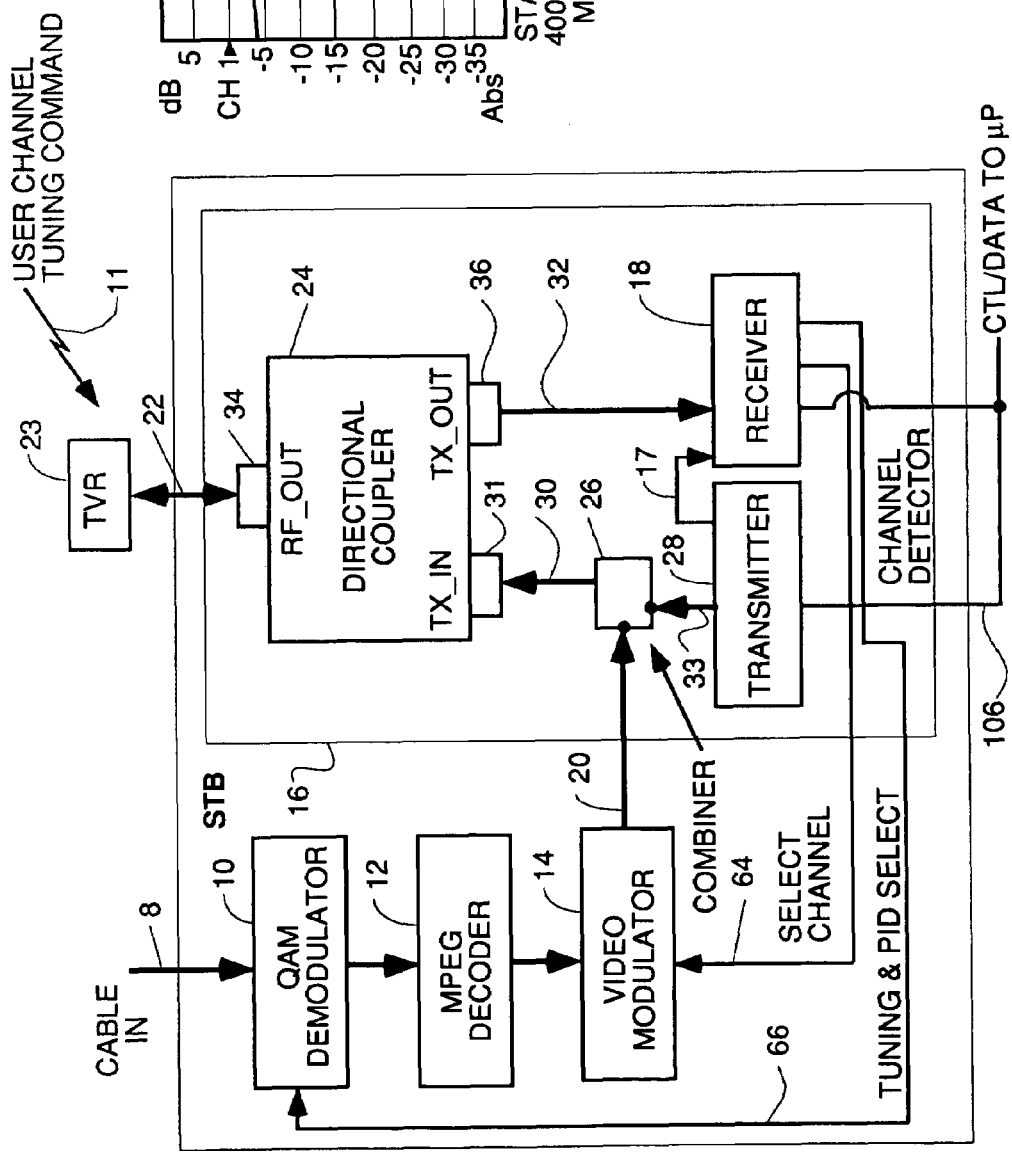

PREFERRED XMITTER

METHOD AND APPARATUS FOR DETERMINING CHANNEL TO WHICH A TV OR VCR IS TUNED

FIELD OF USE AND BACKGROUND OF THE INVENTION

The field of the invention pertains to delivery of digital video programs over cable television (CATV) hybrid fiber coaxial (HFC) cable systems.

Many CATV systems exist in the world today. Until recently, they were used to distribute analog video broadcasts on 6 MHz wide radio frequency channels that were frequency division multiplexed.

In the last decade, with the development of MPEG compression standards and digital video program servers, video programs began to be delivered in compressed digital format. Direct broadcast satellite systems were probably the first to do this on a commercial scale. However, direct broadcast satellite systems do not have an ability to interact in real time with the user other than perhaps by telephone line modems, which to this point have only been used to collect payment information for near video on demand purchases (video programs transmitted on regular intervals which a subscriber can buy but which cannot be ordered on demand).

Cable operators would like to recover the bandwidth consumed by analog video signals and transmit more digital video channels within the same bandwidth. Digital video offers the ability to transmit more channels in the same bandwidth because approximately 10 digital, compressed video programs can be transmitted in the same 6 MHz bandwidth channel in which a single analog channel was previously transmitted. Digital video is transmitted in MPEG packets on MPEG transport streams. Each MPEG packet has a packet identifier in its header called a PID. Each video program is comprised of several program elementary streams (PES) such as video, audio, PCR timing, supplemental data, secondary language, etc. Packets of each PES of a given program have a unique PID.

The problem with substituting digital video for analog video is that, without some adapter, transmission of digital video instead of analog video on an HFC system would instantly obsolete millions of analog TVs and VCRs. Fortunately, adapters called set top decoders or set top boxes (STB) exist which can tune to RF channels on the HFC, extract the MPEG packets of a requested video program, decompress them and decrypte them, convert them to video signals, and modulate the video signals (which include audio information) onto whatever RF channel to which a TV or VCR is tuned.

In prior art set top boxes (STB), a separate remote control for the STB existed to tune the STB to a particular analog or digital video channel. The resulting output video signal would then be modulated upon analog TV channel 3 or 4 and the TV remote control did not need to be used since all channels on the HFC would be remodulated onto channel 3 or 4.

However, that leaves the problem with what to do about an analog VCR which has been programmed to record a program when the user is away. The VCR can be programmed to tune to channel 3 or 4 at a specific day and time, but this does not cause the STB to automatically tune to the appropriate channel that the user wanted to record. Some manufacturers such as Phillips (the manufacturer of TIVO® personal digital video recorders (which also can be programmed to record a program while the user is away) have attempted to solve this problem by providing an infrared transmitter that drives an infrared transducer. The infrared transmitter is controlled by the programming circuitry to generate a suitable infrared signal to cause a set top box to tune to a specific channel when the TIVO or VCR tunes to channel 3 or 4 to record the program. To use these systems, the infrared transducer must be taped or otherwise affixed to the STB in a position to direct the infrared signal into the infrared window. If something happens such as the infrared transducer being moved or dislodged or unplugged, the recording process can fail. The infrared transducer is also unsightly.

It would be more elegant and foolproof if the user could simply program an analog VCR to tune automatically to a channel to be recorded at the appropriate time and for the STB to do the rest. That is, the STB driving the VCR RF input would automatically sense to which channel the VCR just tuned. The STB would then automatically determine which video program that channel corresponds to, tune the appropriate channel, recover the appropriate MPEG or other packets, convert them to video and remodulate the video onto the RF channel to which the VCR or TV was tuned.

It would also be advantageous to be able to automatically sense the channel a user tuned to on an analog TV using the TV's remote control and determine which digtal video program that channel corresponds to and automatically tune to the channel on the HFC that program is being carried on and extract the packets carrying the data of the requested program, convert them to video signals and remodulate the video signals onto an RF carrier having the frequency of the channel to which the user tuned the TV.

Circuitry to infer the TV channel to which a user has tuned by detecting radiated energy from the local oscillator of an analog TV was disclosed in a U.S. patent application entitled METHOD AND APPARATUS FOR PROVIDING DIGITAL SET TOP BOX FUNCTION AND USING TELEVISION'S REMOTE CONTROL TO CONTROL SAME, filed Nov. 16, 2002, Ser. No. 10/295,184, which is hereby incorporated by reference. The circuitry disclosed there receives radiated energy from the local oscillator of the TV, counts its frequency and uses the frequency as a search key into a lookup table. The lookup table indicates the TV channel each local oscillator frequency corresponds to, the QAM channel on the HFC that the video program on the TV channel is being carried upon, and may, in some embodiments, indicate the PIDs of the requested program.

This approach has the weakness that spurious emissions from strong signals of local TV or radio stations, ham radio operators or harmonics thereof or electromagnetic interference from any other source can interfere with the frequency counter's accuracy. This can lead to mistakes in tuning of the STB.

Therefore, a need has arisen for a method and apparatus to reliably determine the channel to which a TVR is tuned for purposes of controlling a digital set top box to drive an analog TV or VCR.

BRIEF DESCRIPTION OF THE DRAWINGS

FIG. 1 is a block diagram of a simple set top decoder which incorporates return loss channel detection circuitry.

FIG. 2 shows an actual network analyzer measurement of return gain (the negative of return loss) of a TVR tuner.

SUMMARY OF THE INVENTION

Conventional analog TVs and VCRs (referred to collectively as TVR) have tuners that incorporate a tunable bandpass filter (BPF). The frequency band which this filter passes to the rest of the tuner circuitry corresponds to the channel that is selected by the TVR. By detecting the passband frequency of the bandpass filter, it is possible to determine the channel selected by the TVR using a table that maps a passband frequency to a channel number. This channel number can then be mapped to the frequency of a QAM channel on the HFC system and the transport stream and PIDs of the packets which carry the data of the requested channel's broadcasts.

The passband frequency can be determined by measuring the return loss at the RF input of a TVR. At the passband of the BPF, the return loss at the RF input will be maximum. By generating a wide band signal, the Fourier frequency component having the lowest reflected power will be at the passband frequency. In alternative embodiments, multiple signals, each at a different frequency can be generated and transmitted simultaneously or in groups of one or more to the RF input of the TVR and the return loss of the reflected energy from each signal measured. The lowest magnitude reflected signal will indicate the passband frequency. The preferred way of doing this is to use a sequence of different frequency RF signals which are inside the passbands of all possible channel locations for the passband. The power magnitude of each signal reflected back from the RF input is measured. The RF signal having a frequency inside the passband to which the tuner of the TVR is currently tuned will have the greatest return loss, i.e., the lowest reflected power. By comparing the power of all the reflected RF signals and identifying the lowest power band, the frequency of the passband is determined.

In an alternative embodiment, the inference drawn from determining the return loss is used to confirm the inference of the selected TVR channel drawn by counting the frequency of the electromagnetic leakage radiation emitted by the local oscillator. Because the return loss determination is more reliable than the local oscillator leakage process, in the case of a conflict, the inference drawn by the return loss would control.

Figure 3:
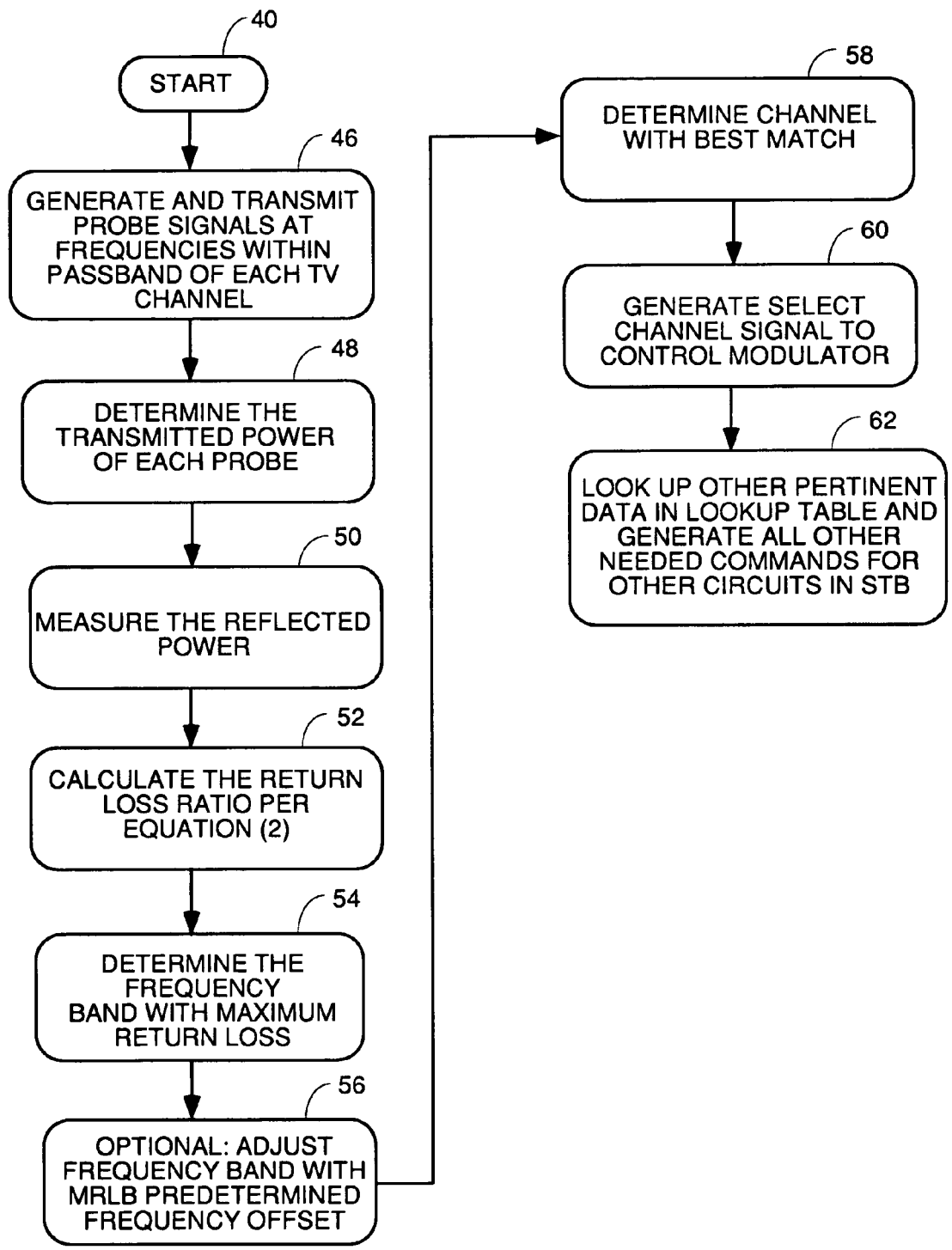
FIG. 3 is a flowchart of the process implemented by the channel detector 16 to use return loss to detect the channel to which a TVR is tuned.

In the preferred embodiment, the return loss alone is used to determine the channel to which the TVR is tuned, one species of this genus being the process symbolized by the flowchart of FIG. 3.

One problem with the return loss approach is that sometimes multiple frequency components will have low reflected power, and the band of frequencies with low reflected power return loss span more than one channel. This creates an ambiguity in which channel to choose. A particularly preferred embodiment solves this problem by making use of the fact that each TV or VCR has its own unique signature in terms of the return loss characteristics of each channel. The set top decoder generates a signal or signals suitable to probe the return loss of every channel during a training process and records the reflected power of each frequency component while the TVR is tuned to that channel. The set of reflected powers is recorded in a table as a signature for that channel. The next channel is tuned, and the process is repeated, and the reflected powers of the multiple probe frequencies is recorded as the signature of the channel. This embodiment can operate by generating graphic instructions on the screen of the TV or on a display of the STB coaching a user to manually tune to each channel and keep the TVR on that channel while the signature is being learned. In a more preferred embodiment, the STB includes an "IR blaster" which generates infrared commands to tune the TVR tuner to each channel during the training process while the STB is learning each channel's signature.

In still another embodiment, the STB will learn the static electromagnetic interference patterns which exist in the area of use such as might be caused by radio stations, harmonics, etc. This is done so that they can be discounted in the process of measuring return loss or in embodiments which listen to leakage from the local oscillator.

Another novel aspect of the invention is a way to generate a probe frequency, i.e., sinusoidal signal test tone at a desired frequency using harmonics generated in a digital-to-analog (DAC) converter. This method uses a digital-to-analog (DAC) converter with a sample rate that is lower than twice the highest sinusoid frequency to be generated. The DAC is coupled to a wideband amplifier without using an image rejection low pass filter. Typical DACs use zero order hold functions, and this generates signal images at frequencies above the Nyquist rate. A base frequency sinusoid is generated at a sub Nyquist frequency. This base frequency is selected such that one of the related DAC images (harmonics) falls at the desired probe signal frequency.

In the preferred method, multiple probe signals are generated from each base frequency and multiple or a variable sampling frequency is used when generating probe signals from particular base frequencies such that when one or more probe signals calls in a null or high attenuation region of a Sinc function power mask, the sampling frequency of the zero order hold D/A converter can be changed so as to change the position of the null of the Sinc function power mask.

Multiple set up processes using the remote control of the TV, an internal infrared transmitter or transceiver in the STB or a special external remote control for the STB are taught. All learn the signature of each TV channel and use the signatures along with return loss ratio measurements on a plurality of probe signals to determine or at least verify the channel to which the TVR is tuned at any specific time.

DETAILED DESCRIPTION OF THE PREFERRED AND ALTERNATIVE EMBODIMENTS

TVR tuners incorporate a tuner which tunes to a particular selected channel frequency and down converts the carrier of the selected channel to a predetermined IF frequency. The first circuit of such a tuner is a bandpass filter (BPF). When the TV or VCR remote control is used to change the tuner's channel, the BPF is tuned such that the passband frequency corresponds to the bandwidth and center frequency of the selected channel. The rest of the RF band is rejected.

FIG. 1 is a block diagram of a simple set top decoder which incorporates return loss channel detection circuitry. A quadrature amplitude (QAM) demodulator 10 serves to tune the QAM channel on a hybrid fiber coaxial cable television signal distribution system 8. This QAM channel maps to a channel selected by the user in an infrared or RF channel tuning command 11 made using the remote control of the analog TVR (TV or VCR). If for example, the user tunes to channel 78 to watch Discovery Wings, that channel 78 may map to QAM channel 3, transport stream 1, subchannel 5. It is the job of receiver 18 to figure this out using a return loss algorithm.

The QAM demodulator outputs MPEG packets to MPEG decoder 12 which decodes them to generate decompressed video and audio data which is used by video modulator 14 to modulate an RF carrier of the frequency of the channel selected by the user via command 11. This analog RF TV signal on line 20 is transmitted to the RF input 22 of the TVR 23 via combiner 26 and directional coupler 24.

Many circuits that go into a set top decoder such as a, tuner control microprocessor, conditional access circuitry, NTSC encoder etc. are not shown for simplicity since they are not part of the teachings of the invention.

A simplified view of the circuitry that implements the teachings of the invention is included within box 16. Transmitter 28 generates the tones that are injected into RF input 22 through combiner 26 to measure return loss. Switch 26 selects the input to the TX_in port 31 as either the output 33 of the transmitter 28 or the output 20 of the video modulator 14.

Directional coupler couples RF signals travelling toward RF input 22 on line 30 into RF input 22 and couples reflected power travelling back from RF input 22 toward directional coupler 24 to receiver 18 via line 32. Because the return loss is a ratio, the receiver has a link 17 to the transmitter to receive information about the transmitted power of each probe signal. This can be in the form of digital data sent by transmitter 28 indicating its output power setting, or it can be in the form of a sniffer connection for the receiver 18 to actually sample the output signal on line 33 and derive its power. In some alternative embodiments, the receiver 18 will assume that each transmitted probe signal has the same power which is known in advance by both the transmitter 28 and the receiver 18 and not deviated from by the transmitter.

Transmitter 28 must be capable of generating tones within each passband for a channel which can be tuned on TVR. The receiver 18 must be capable of measuring the reflected power of each tone and drawing an inference as to what channel to which the TVR is tuned. The directional coupler must be able to isolate the transmit port 30 from the receive port 32. The directional coupler 24 is designed so that the majority of power generated by the transmitter 28 will be coupled to RF_out port 34 and not at TX_out port 36. Thus, the majority of the power presented at TX_out port 36 is reflected power and not transmitted power.

Transmitter 28 generates a signal x_out(t) with a frequency spectrum of Xout(jw) where Xout(jw) is the Fourier transform of x_out(t). Assume there is perfect impedance matching between the output line 22 and the input impedance of the TVR 23, and assume there is complete isolation between the TX_In port 31 and the Tx_out port 36. In this case, Fourier components (frequencies) of the input signal on line 22 which are not passed through the BPF (not shown) in the tuner in TVR 23 will be reflected back into line 22. Directional coupler 24 guides them to receiver 18 via Tx_out port 36 and line 32. The frequency content of the signal received at Tx_out is therefore:

$$X\text{out}(jw) = X\text{in}(jw) * (1 - H_{bpf}(jw)) \quad (1)$$

where $H_{bpf}(jw)$ is the frequency response of the TVR tuner's bandpass filter.

The return loss at each frequency is the ratio between the spectral density of the output signal and the input signal, as follows:

$$RL(jw) = -10 \log_{10}(|X_{out}(jw)|^2/|X_{in}(jw)|^2) = -10 \log_{10}(|1 - H_{bpf}|^2) \quad (2)$$

where $|*|^2$ denotes the power magnitude of the signal represented by * which is the square of the amplitude of the complex phasor.

If the BPF were perfect, at the passband frequency to which it is tuned (usually comprising more than one frequency component) its transfer function $|H_{bpf}(jw)|=1$ and the stop band frequency components would be affected by a BPF transfer function $|H_{bpf}(jw)|=0$. Therefore, in the passband, the return loss is infinite meaning all transmitter frequency components within the passband are fully absorbed and there is no reflected power, and the return loss in the stop band would be zero meaning all transmitter frequency components in the stop band are fully reflected.

In a practical system, the isolation is not perfect nor is the BPF filter characteristic perfect. This results in return loss which is not infinite in the passband nor zero in the stopband. However, the return loss in the passband will always be higher than the return loss in the stopband. FIG. 2 shows an actual network analyzer measurement of return gain (the negative of return loss) of a TVR tuner. The horizontal axis represents the frequency of the probe signal applied to TVR RF input 22. The vertical axis represents the return gain, and the function 38 represents the return gain at each probe frequency. The selected channel in this example spans from 470 MHz to 476 MHz. Function 38 shows that the maximum return loss is approximately inside the selected channel.

To improve the association between the maximum return loss band (MLRB) and the selected channel, an adjustment can be made to the MLRB using a predetermined function, offsetting the MRLB frequency. The appropriate function can be established based on a known tuner characterization, or using a calibration process from a few selected channels that are known.

FIG. 3 is a flowchart of the process implemented by the channel detector 16 to use return loss to detect the channel to which a TVR is tuned. The simplest process embodiment is to determine if a TVR is tuned to a particular TV channel is comprised of the following three steps:

generating one or more probe signals having frequencies within the passband or some of which are within and some of which are without the passband of a tunable bandpass filter within a tuner of a TVR when the TVR is tuned to a particular TV channel;

transmitting the probe signals to an RF tuner input of the TVR and coupling reflected power back to an input of a receiver;

in the receiver, calculating a return loss ratio and determining therefrom whether the TVR is tuned to the particular TV channel.

The process of FIG. 3 starts at block 40 and transitions to step 46. In step 46, transmitter 28 generates and transmits probe signals at frequencies within the passband of each TV channel in step 46. These signals may be generated one at a time, or a broad bandwidth signal with Fourier frequency components in each TV channel may be transmitted. Step 48 represents the process of determining the transmitted power of each probe signal. This can be done in many ways. If each probe signal is generated individually, the power of each probe may be determined from digital data sent by the transmitter on data path 17, or measured from a sample of each probe collected by a sniffer probe or looked up in memory in embodiments where the transmitter uses a fixed, known power for each probe signal. In embodiments where a single broad bandwidth probe signal is generated, a sniffer probe samples the probe signal and the receiver 18 takes a Fourier transform and calculates the power of each frequency component. In alternative embodiments, the transmitter takes a Fourier transform of the single probe signal and calculates the power of each Fourier component and sends data to the receiver indicating the power of each probe signal. In the preferred embodiment, the power of each probe signal is fixed and known to both the transmitter and receiver, so no sampling or communication between the transmitter and receiver are necessary. In step 52, the return loss ratio for each probe signal is calculated using equation (2) above.

Figure 6A:
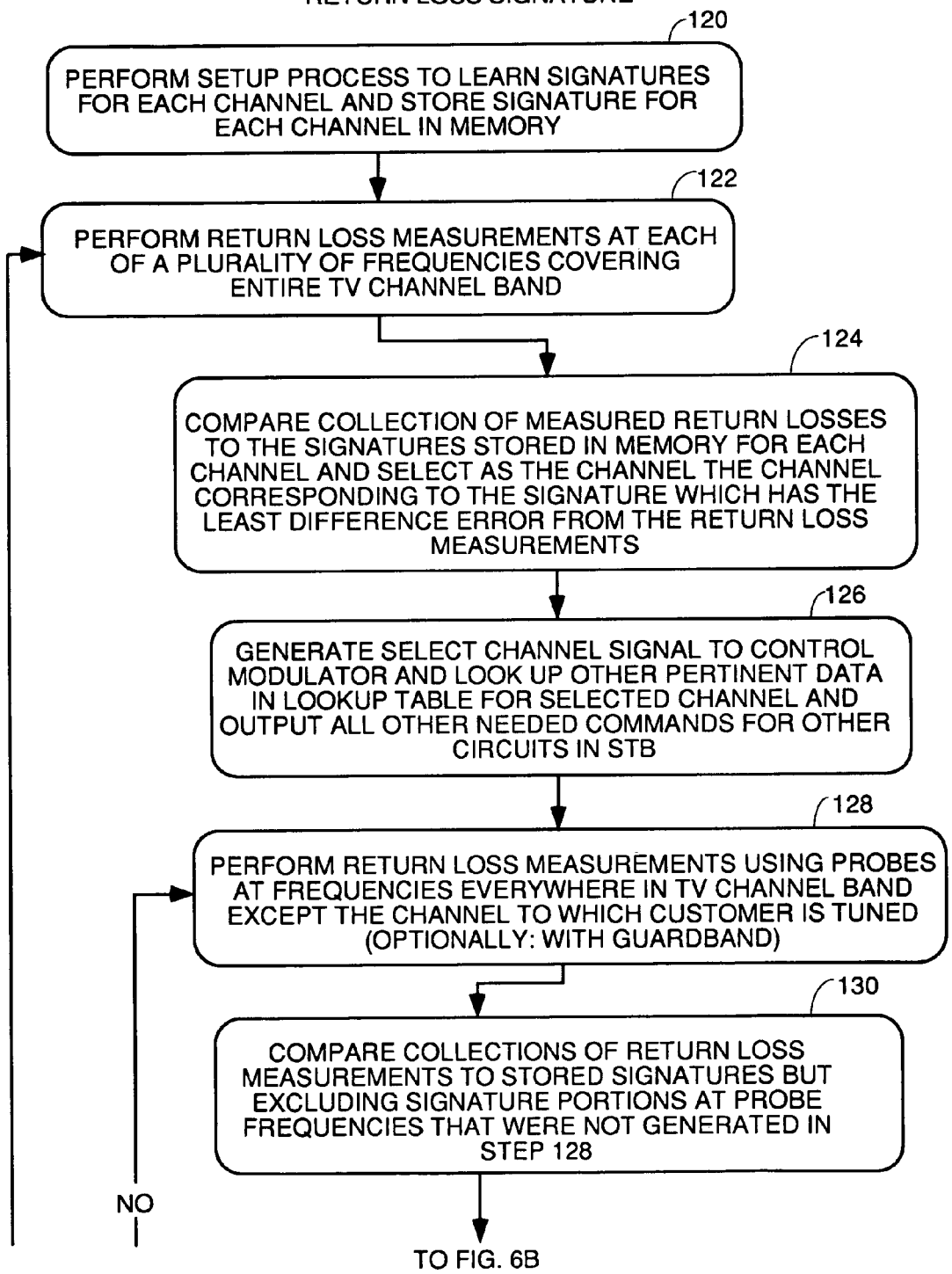
FIG. 6 is a flowchart of the preferred method for detecting a selected channel using return loss measurements.
Figure 6B:
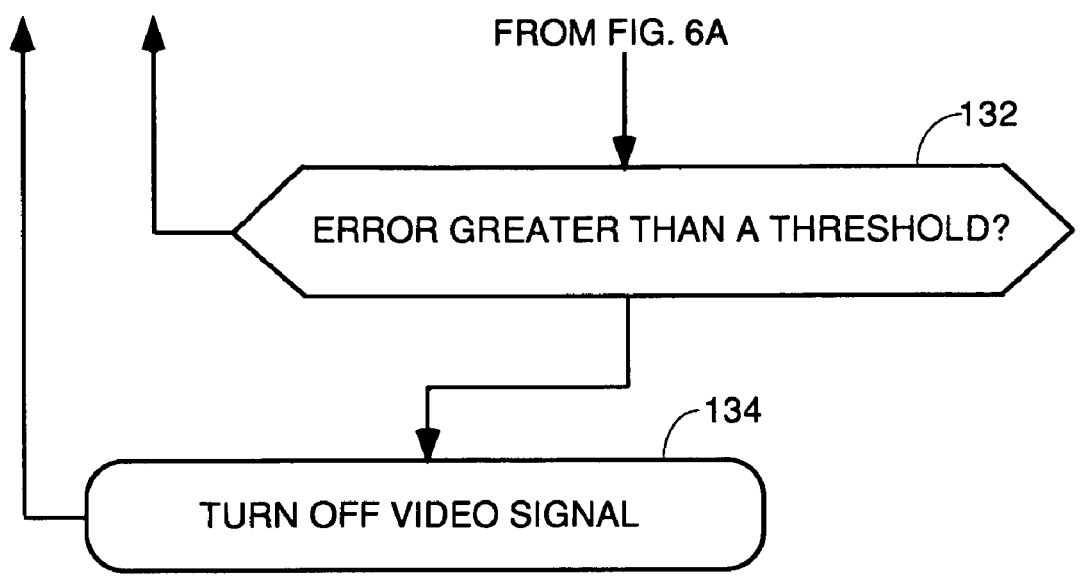

Steps 54, 56 and 58 are optional, and step 124 of FIG. 6 can be substituted for these three steps.

Step 54 determines the frequency band with the maximum return loss ratio. This is done simply by comparing the return loss ratio at each frequency with the return loss at the other frequencies.

Step 56 adjusts the frequency band with the maximum return loss by a fixed, experimentally determined frequency offset for better matching to a TV channel in the next step.

In step 58, the channel with the best match to the frequency having the maximum return loss is determined by comparing the frequency with the maximum return loss to the frequency ranges of each TV channel. The channel having the best match is selected in step 60 and a channel select signal is generated on line 64 in FIG. 1. This signal controls the RF carrier frequency generated by modulator 14 to match the frequency of the TV channel determined in step 58 to be the channel to which the TVR is tuned.

In step 62, the receiver 18 generates other control signals needed by the STB. For example, the receiver 18 looks up the channel determined in step 58 in a lookup table to determine the QAM channel on which it is broadcast and the MPEG transport stream which carries the video, audio, PCR timing and supplementary data of that channel. The lookup table entry also contains the PID for the PMT table of the channel selected. The receiver then uses this data to send a tuning command on line 66 to the QAM demodulator and tuner 10 to tell it which QAM channel to tune and sends the PID of the PMT table to the QAM demodulator to control a transport stream demultiplexer therein to select out the MPEG packets containing the PMT table, reconstruct that table and use the PIDs listed therein to extract the video, audio, PCR and supplementary data packets of the selected channel.

Step 50 represents the process of the receiver measuring the reflected power of each probe signal. This is done in conventional fashion.

Figure 4:
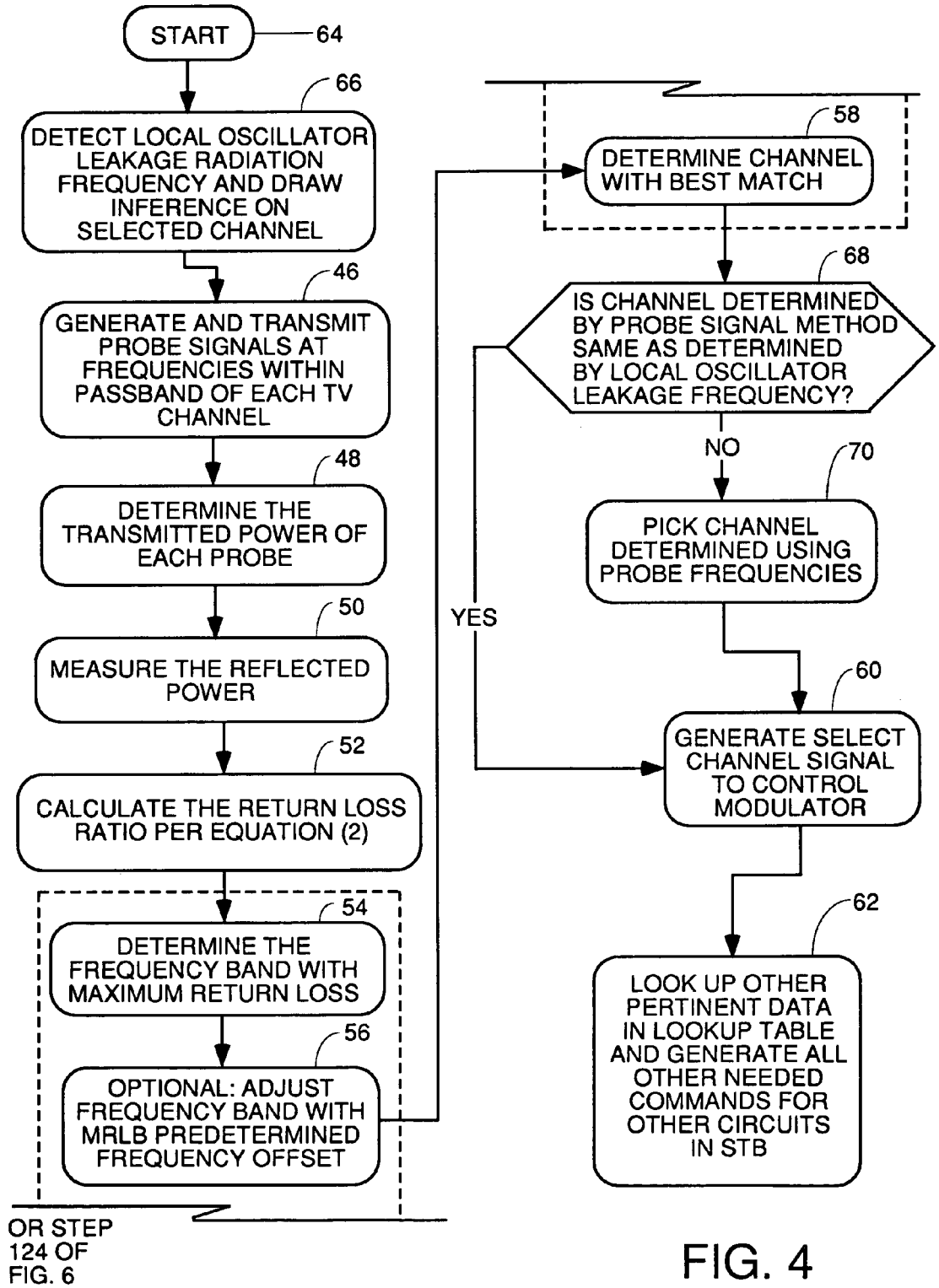
FIG. 4 is a flow diagram of an alternative embodiment where the local oscillator leakage frequency is used to determine the channel to which the TVR is tuned, and the return loss method is used to confirm the conclusion drawn from the frequency of the leakage radiation.

FIG. 4 is a flow diagram of an alternative embodiment where the local oscillator leakage frequency is used to determine the channel to which the TVR is tuned, and the return loss method is used to confirm the conclusion drawn from the frequency of the leakage radiation. The process starts at 64. Step 66 represents the process of detecting leakage radiation from the local oscillator of the TVR, counting its frequency and using that frequency to search a table that lists for various frequencies the corresponding channel to which the TVR is probably tuned. Since radio frequency interference can interfere with the accuracy of this process, the return loss method is then performed to verify the conclusion drawn by the leakage radiation frequency measurement. Steps 46 through 58 are identical to correspondingly numbered steps in FIG. 3. After the channel with the best match based upon the frequency at which the return loss was maximum is determined in step 58, test 68 is performed to compare that channel number with the channel number inferred from the process of step 66. If the two channel numbers are the same, step 60 is performed to generate the select channel signal to control the video modulator 14. Then step 62 is performed to look up any other pertinent data, such as QAM channel frequency, needed to control other circuits in the STB.

If test 68 determines that there is a disagreement between the channel inferred by the process of step 66 and the return loss process, step 70 is performed to resolve the contention by picking the channel determined from the return loss process of steps 46 through 58. This is done because the return loss process cannot be interfered with by stray radiomagnetic interference signals like the local oscillator leakage radiation process. After step 70 is performed, steps 60 and 62 are performed.

Figure 5:
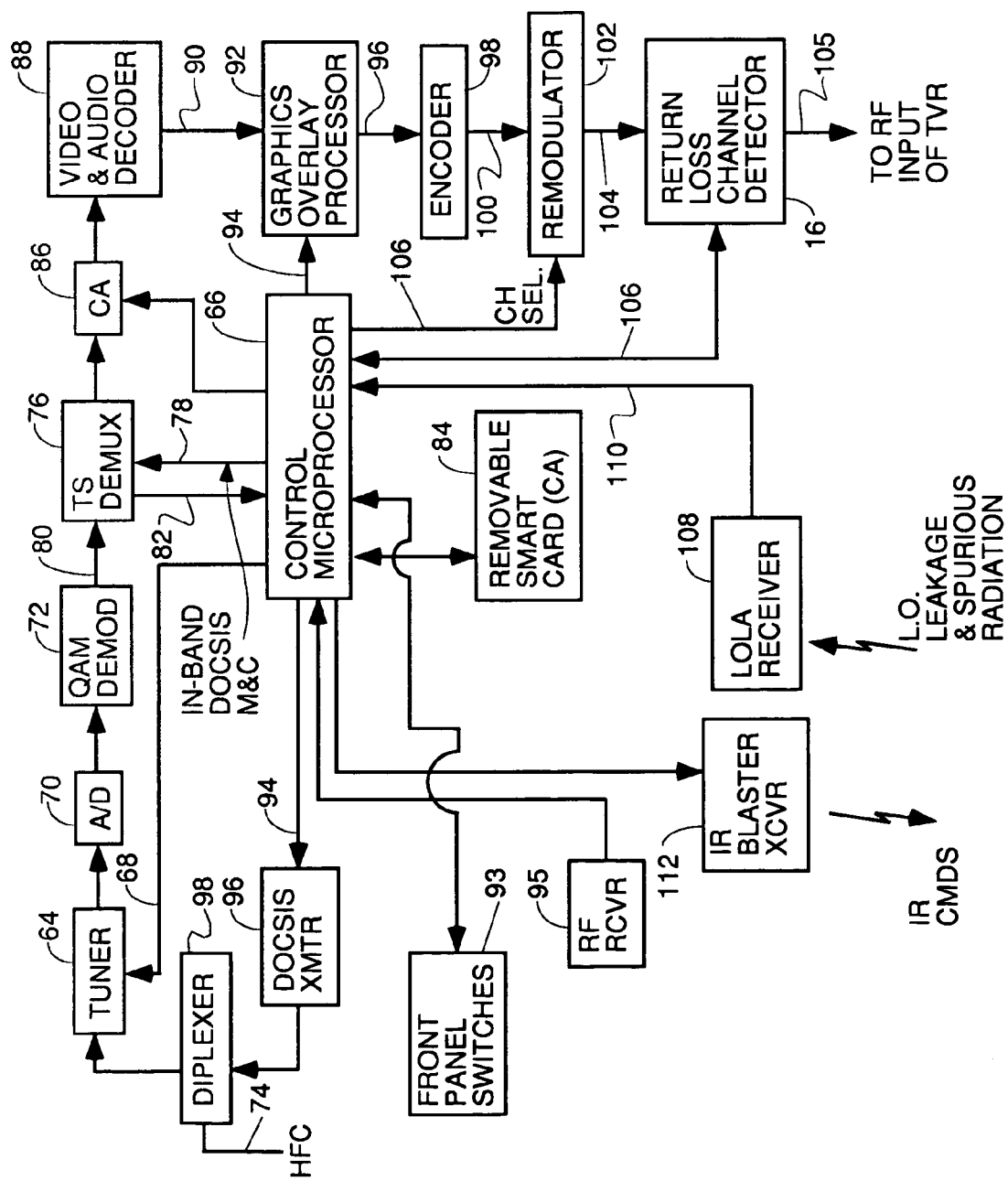
FIG. 5 is a block diagram of an alternative embodiment of a set top box which has an IR blaster and can detect the TVR channel by a LOLA interface or by return loss or both and which can learn the signature of each channel's return loss to enable more accurate return loss inference, and which can learn the spurious radiation signals in an area that might interfere with the LOLA interface.

FIG. 5 is a block diagram of an alternative embodiment of a set top box which has an IR blaster and can detect the TVR channel by a LOLA interface or by return loss or both and which can learn the signature of each channel's return loss to enable more accurate return loss inference, and which can learn the spurious radiation signals in an area that might interfere with the LOLA interface. A tuner 64 tunes to whatever QAM channel a control processor 66 commands on line 68. The tuner filters out unwanted RF signals and converts the RF signal of the desired channel to an intermediate frequency. An A/D converter samples the IF frequency and outputs samples to a quadrature amplitude demodulator 72 (QAM demodulator). The QAM demodulator recovers a stream of MPEG or other packets encoded into QAM constellation points received on HFC system 74. A transport stream demultiplexer 76 receives program filtering instructions on line 78 which instruct it as to which PIDs or other identifiers are in packets on line 80 which contain the video program the user has selected. In-band management and control data messages and other downstream data are sent to the STB on the DOCSIS PID bearing packets which form part of the MPEG or other transport stream on line 80. The management and control messages and other downstream DOCSIS data on the DOCSIS PID are extracted and sent to the control processor via line 82. The processor 66 extracts the M&C messages and other data from the DOCSIS PID packets and uses it to control the STB.

The M&C data can include encrypted session keys for encrypted programs a user has requested. In the preferred embodiment, the return loss channel detector 16 outputs requested channel data on data path 106 that indicates the channel the user has requested as determined in any of the ways disclosed herein. The control microprocessor 66 uses the requested channel data to determine if a conditional access session key is needed to decrypt the requested channel. If so, the processor 66 composes an upstream message requesting the needed session key and sends it upstream using data path 94 and DOCSIS transmitter 96. The head end then sends back the requested session key in an M&C message. These downstream M&C messages containing encrypted session keys are routed to processor 66 and the encrypted session key is then decrypted by the processor 66 in some embodiments or in a removable smart card 84. A secret user key stored in nonvolatile memory in the set top box and the headend (but never transmitted) is used to encrypt the session key at the head end. The same secret user key is used in the STB to decrypt the session key. The STB may contain a removable smart card 84 with a secure microprocessor or other decryption circuitry besides nonvolatile memory used to store the user key which is used to decrypt the session key.

The decrypted session key is sent by processor 66 to conditional access circuit 86 which uses it to decrypt a working key sent as part of the MPEG transport stream.

The programming instructions on line 78 instruct the TS demultiplexer 76 to send packets with the PID of the working key to CA circuit 86 for decryption. The CA circuit 86 uses the decrypted session key to decrypt the working key and uses the decrypted working key to decrypt the video and audio data in packets of the selected video program extracted by TS demultiplexer 76 and sent to CA circuit 86. The decrypted video and audio data is sent to video and audio decoder 88 which decompresses it and resynchronizes the video with the audio using PCR timing data to synchronize a local clock and video and audio decode and present timestamps transmitted in the transport stream on line 80. The microprocessor 66 requests the encrypted session keys it needs for programs selected by the user via an upstream DOCSIS data path comprised of line 94, DOCSIS transmitter 96 and diplexer 98. The headend responds by sending the requested session keys in downstream M&C messages.

The video and audio signals are output on line 90 to a graphics overlay processor 92 which overlays data on the picture such as the program guide, supplementary information about a program such as actors, plot summary, etc. The M&C data received by processor 66 includes program guide data and other data to be displayed on the TV in some embodiments. Also, the transport stream on line 80 has supplementary data for some programs with the supplementary data being sent on its own PID and listed in the program map table (PMT) for the user selected program. The PMT table is transmitted on its own PID. The program instructions on line 78 include the PID of the PMT table for the selected program in some embodiments. This allows the TS demultiplexer 76 to extract the PMT table, extract the video, audio, supplementary data and PCR timing PID packets of the requested program and route the extracted packets accordingly. The supplementary data on line 90 and any data the processor 66 wants to display (received on line 94) is overlaid on the video by graphics processor 92 onto the video data generated on line 96. Line 96 also contains audio data.

An encoder 98 combines the video and audio data into an NTSC, PAL or SECAM video signal on line 100. A remodulator 102 modulates the video signal onto an RF carrier on line 104 at the channel frequency selected by the control signal on line 106. The processor 66 generates this channel select signal as part of step 60 in FIGS. 3 and 4.

Channel Detection

The return loss channel detector 16 has the circuitry of FIG. 1 to measure the return loss, draw an inference as to the channel to which the TVR is tuned and send data on line 106 indicating to which channel the TVR is tuned. A LOLA receiver 108 having the structure and operation described in U.S. patent application METHOD AND APPARATUS FOR PROVIDING DIGITAL SET TOP BOX FUNCTION AND USING TELEVISION'S REMOTE CONTROL TO CONTROL SAME, filed Nov. 16, 2002, Ser. No. 10/295,184 of which this is a continuation-in-part exists to detect local oscillator radiation and count its frequency. The frequency count is sent to microprocessor 66 on line 110, and the microprocessor is programmed to compare the frequency count to the frequencies that would exist if the TVR is tuned to specific channels. The processor 66 then draws an inference as to what channel the TVR is tuned to. In some embodiments, it uses the inference drawn from the frequency count on line 110 alone (with or without the spurious radiation pattern learning described below), and the return loss channel detector circuitry 16 is eliminated. In other embodiments, only the inference drawn by the return loss channel detector circuit 16 is used (with or without signature learning to be described below), and the LOLA receiver 108 is eliminated. In some embodiments, the inference drawn from the LOLA receiver's frequency count is cross checked against the inference data on line 106, and any conflict is resolved in favor of the return loss inference data on line 106, as shown in FIG. 4.

Infrared Blaster and Training

An infrared blaster transmitter (or transceiver where the IR blaster will learn IR commands beamed toward it) 112 is used to learn the infrared commands of the TV or VCR remote and to generate infrared commands to do the functions described below for system initialization and training. Each TV channel has a unique return loss signature. A return loss signature is the unique collection of return loss at each of a plurality of probe frequencies. A tuner may have a passband at a particular channel, but it may also have passbands at other frequencies and will have different impedance characteristics at each different frequency. In other words, when a tuner is tuned to channel 3, for example, it will have a maximum return loss at a probe frequency within channel 3, but it will also have return losses of lesser amounts at each of a plurality of frequencies outside channel 3. Because the characteristics of the bandpass filter in each tuner for each selected channel are unique, each selected channel has a unique return loss power magnitude or signature. A signature is comprised of the unique return loss at a single frequency in some embodiments. In other embodiments, the collection of the return losses at each of a plurality of frequencies is a pattern which is called a signature. The return loss characteristics at one or more probe frequencies when a tuner is tuned to a specific channel can be stored in memory as a signature for a particular channel.

The preferred method for detecting a selected channel using return loss measurements is illustrated in the flowchart of FIG. 6. Step 120 represents the setup process to learn the signatures for every channel and store the signature for every channel in memory. That setup process will be described in FIG. 7.

Once the setup process has been perform, normal operations start with step 122 where return loss ratio measurements are made at each of a plurality of frequencies covering the entire TV channel band. Next, in step 124, the collection of return losses measured in step 122 is compared to the signatures stored in memory for each channel. The channel whose signature has the least differences is selected as the channel to which the tuner is tuned. Then in step 126, a select channel signal for the detected channel is sent to the control modulator to control the RF channel frequency it generates and upon which the outbound video signal from the STB is modulated. Any other commands needed for other circuits in the STB are also looked up from a lookup table based upon the detected channel and sent to the appropriate STB circuits in step 126. For example, using the circuitry of FIG. 1 as an example the receiver 18 which does the signature detection looks up the channel determined in step 124 in a lookup table to determine the QAM channel on which it is broadcast and the MPEG transport stream which carries the video, audio, PCR timing and supplementary data of that channel. The lookup table entry also contains the PID for the PMT table of the channel selected. The receiver then uses this data to send a tuning command on line 66 to the tuner in QAM demodulator 10 to tell it which QAM channel to tune. The receiver then also sends the PID of the PMT table to the QAM demodulator portion of circuit 10 to control a transport stream demultiplexer therein to select out the MPEG packets containing the PMT table and reconstruct that table. The QAM demodulator also includes a transport stream demultiplexer which uses the PIDs listed in the PMT table to extract the video, audio, PCR and supplementary data packets of the selected channel and send them to the MPEG decoder. In embodiments where conditional access is used, and the working keys are stored in the lookup table with the channel signatures, the working keys are sent to a conditional access circuit (not shown) to decrypt the encrypted portions of the program.

In other embodiments such as shown in FIG. 5 where an upstream DOCSIS transmitter 96 is present, the channel selected is used to generate an upstream message requesting a session key for the selected channel. The returned session key (session key is sent on the in-band DOCSIS channel usually) is then routed to the control microprocessor 66 as a management and control message where the session key is extracted and sent to the removable smart card 84. There the session key is decrypted with the private user key of the STB. The decrypted session key is then sent to the conditional access circuit 86 via microprocessor for use in decrypting the working key which is delivered in the MPEG transport stream with the desired program.

Step 128 represents the first step in a tracking process to determined if the user is still tuned to the channel which step 124 concluded the user was tuned. In step 128, the system performs return loss measurements using probe frequencies at frequencies that cover the TV channel band except that band of frequencies which represents the TV channel to which the tuner is currently tuned (optionally: plus a guardband). In step 130, the collection of return losses is compared to the stored signatures with the portions of each signature covering the TV channel to which the tuner is currently tuned excluded from the comparison. In step 132, it is determined whether the error is greater than some threshold set to distinguish if the user is still tuned to the same channel. If the error is not greater than the threshold, processing returns to step 128. If the error is greater than the threshold, step 134 is performed to turn off the video signal. This can be done by sending a command to stop generating the carrier signal on which the video signal is modulated, or by controlling a switch in the signal path 20 in FIG. 1 to cut off flow of the signal to the combiner 26. Processing then returns to step 122 to begin again the process of determining to which channel the user has tuned using a signature.

The setup process, which is represented by step 120 in FIG. 6, is performed when the STB is connected to the TVR for the first time. The setup process can be performed in any one of the following ways.

Figure 7:
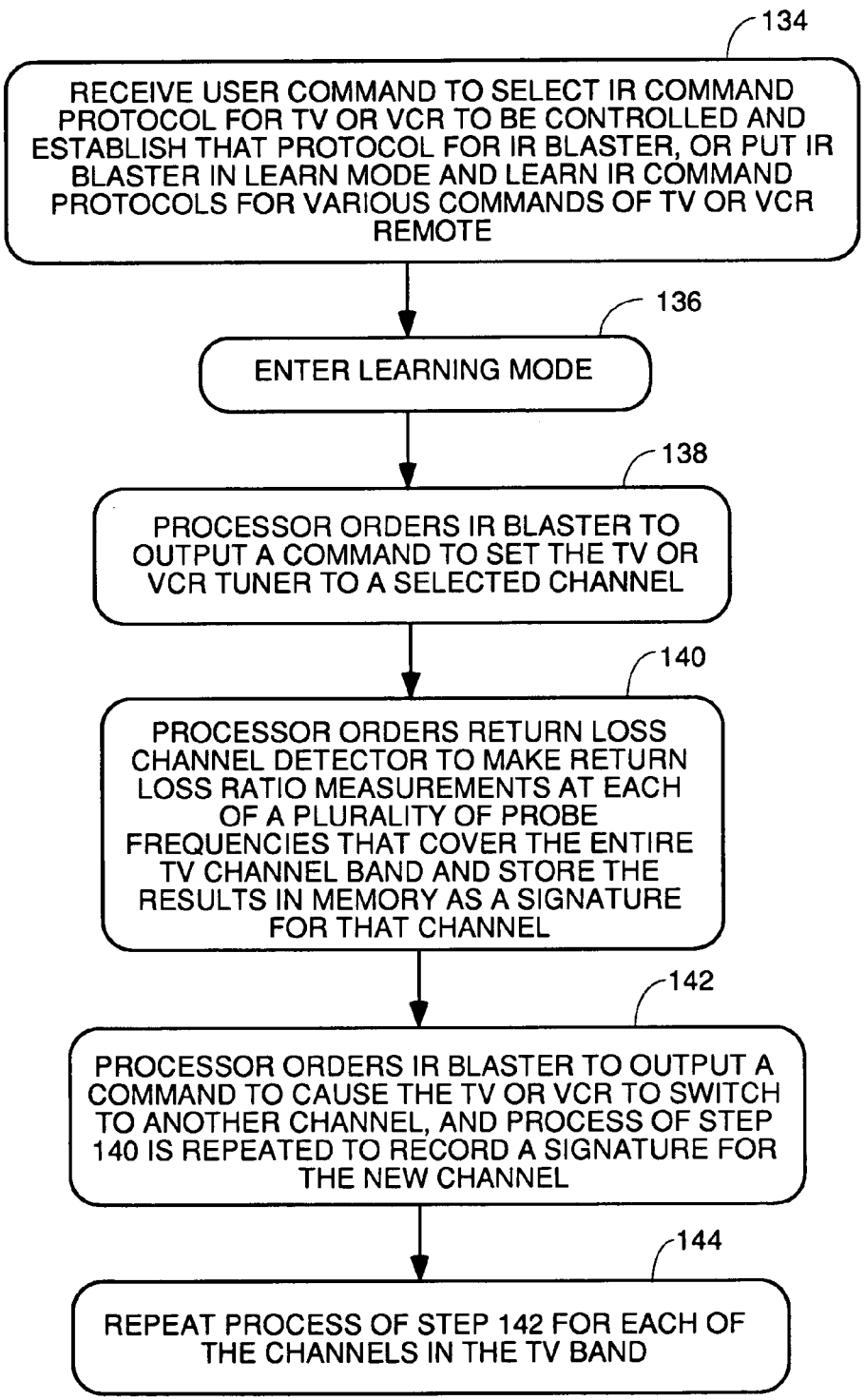
FIG. 7 is a flowchart of a setup method for an STB with a built in IR blaster with universal remote capabilities.

FIG. 7 represents a flowchart of the preferred embodiment of a setup process using a universal remote control infrared transceiver represented by IR blaster 112 in FIG. 5. A suitable IR blaster 112 will have preprogrammed into it a plurality of different infrared command protocols used by manufacturers of popular television brands. For off brands of TVs and VCRs, the IR blaster 112 has the ability to learn the command protocols of the existing infrared remote control for the TV or VCR by putting the IR blaster in learn mode and aiming the remote control at it and pressing the various buttons for the commands to be learned. Step 134 represents the process of establishing the proper IR command set protocols for the IR blaster 112. If the user chooses to use one of the IR protocols built into the IR blaster, the user selects the brand of TV or VCR to be controlled and selects the protocol for that brand, usually through a menu displayed by the graphics overlay processor 92 on the TV and front panel user interface switches etc. 93 or enters a code from a user manual that lists codes for different types of VCRs. This will cause the IR protocol so selected to be established as the outbound IR command protocols from the blaster 112. The blaster 112 includes a laser diode coupled to the IR blaster control electronics by a wire tether so it may be affixed to a TV or VCR to direct its commands into the TV or VCR IR command reception window. The process of establishing the proper IR command protocols for the IR blaster is represented by step 134.

After the user has connected the RF output 105 of the STB to the RF input of the TV or VCR, he either manually selects learning mode or the STB automatically detects the connection of its RF output to a tuner and automatically enters learning mode where channel signatures are to be learned, as represented by step 136. This causes processor 66 in step 138 to order the IR blaster to output a channel change command to set the TV or VCR tuner at a selected channel.

In step 140, the processor orders the return loss channel detector 16 to perform a return loss ratio measurement at each of a plurality of probe frequencies which cover the entire TV channel band while the TV tuner is tuned to the selected channel. The processor 66 or the receiver in the return loss circuit 16 records the return loss ratio measurements at each probe frequency as the signature for that channel. In the preferred embodiment, spacing the probe frequencies at 1 MHz is used and this gives about 6-10 measurements inside the selected channel (yielding an approximation of the passband shape) with the balance of the measurements being outside the passband.

Next, in step 142, the processor 66 orders the IR blaster to change the channel to another channel and orders the return loss channel detector to make a series of return loss ratio measurements at a plurality of probe frequencies covering the entire TV channel band and to record the results as a signature for the selected TV channel. Step 144 represents the process of repeating the process of step 142 for each other channel in the TV band to finish the process of learning a signature for each TV channel.

Figure 8:
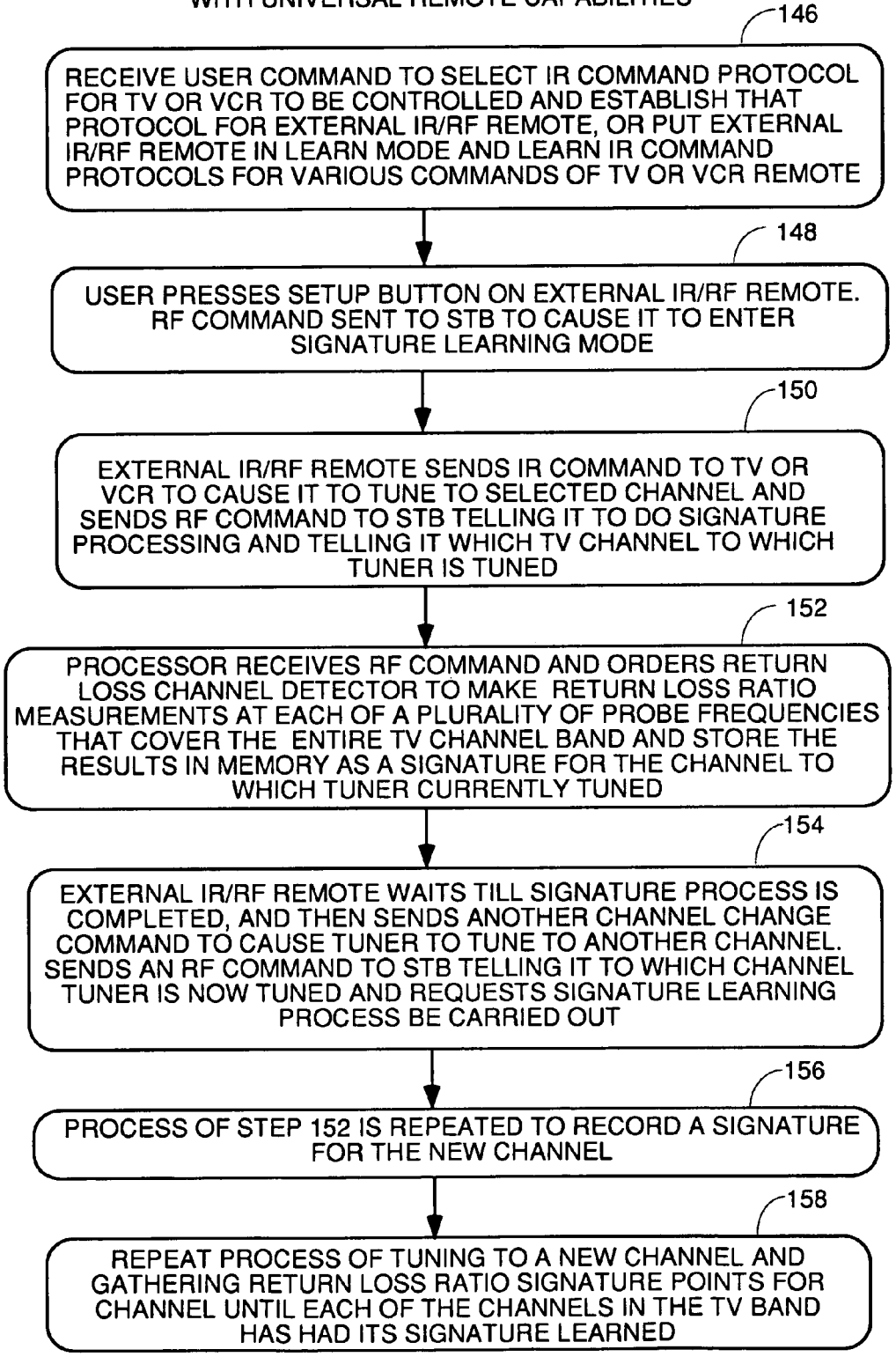
FIG. 8 is a flowchart of a setup process for an STB that is shipped with an external IR.RF remote control which has universal remote control capabilities.

Referring to FIG. 8, there is shown a flowchart of a setup process for an STB that is shipped with an external IR.RF remote control which has universal remote control capabilities. In this process, the external remote is used in a setup mode to automatically command the TV or VCR to step through all the channels and tells the STB via an RF (or IR) command to which channel the tuner is tuned at any particular time. The STB gathers signature data for each channel and stores it in memory. The premise of FIG. 8 is that the STB is shipped with an external remote control (hereafter the STB remote) with an infrared transmitter with universal remote capabilities which can learn IR protocols and which is capable of sending commands to the STB either as infrared commands if the STB is in line of sight or as RF commands in some embodiments so that the STB does not have to be in line of sight. In step 146, the remote control receives a command from the user to select the IR command protocol for the type of TV or VCR whose tuner is to be controlled. This can be done in any known manner such as using the graphics processor to display a list of common TV or VCR manufacturers and having the user select one with a pointing device/cursor control on the remote control. The remote control then loads the selected IR protocol into memory for subsequent use in controlling the TV or VCR tuner. Step 146 also represents the alternative embodiment where the remote control is put into learning mode and learns IR protocol commands as IR commands from the remote control of the TV or VCR is pointed toward the universal remote control and has its various command buttons pushed.

Step 148 represents the user pressing the setup button on the remote control of the STB. This causes the remote control to enter the setup mode and to send an IR or RF command to the STB to cause it to enter the setup mode to learn the signatures of every channel.

In step 150, the STB remote sends an IR command to the TV (hereafter TV or VCR will be shortened to just TV or TVR) commanding it to tune to a first TV channel. This can be any one of the TV channels in the TV band, but for ease of keeping track of which channels have been tuned and had their signatures learned, it is usually the first channel in the TV band or the last. The STB remote then sends a message to the STB telling it to which channel the TV has been tuned.

Step 152 represents the processor receiving the message as to which channel the TV is tuned and ordering the return loss channel detector to make return loss ratio measurements at each of a plurality of probe frequencies that cover the entire TV channel and store the results in memory. The return loss measurements at each probe frequency constitute a signature for the channel to which the TV is currently tuned.

In step 154, the STB remote waits till the signature learning process for the current channel is complete, and then sends another IR command to cause the TV tuner to tune to another channel. A message is also sent to the STB telling it the new channel to which the TV tuner is tuned and requesting that a signature for this new channel be learned. The STB can wait til the signature learning process is complete by waiting a fixed interval, or it can wait for the STB to send an RF or IR message that the signature learning process has been completed.

In step 156, the process of step 152 is repeated to record a signature for the new channel. In step 158, the process of sending an IR command to the TV to cause it to tune to a new channel and sending a message to the STB telling it to which channel the TV has been tuned is repeated. Step 158 also represents the process of gathering the return loss ratio data at each of the probe frequencies for each TV channel, one channel at a time until the entire collection of TV channels has been processed.

Figure 9:
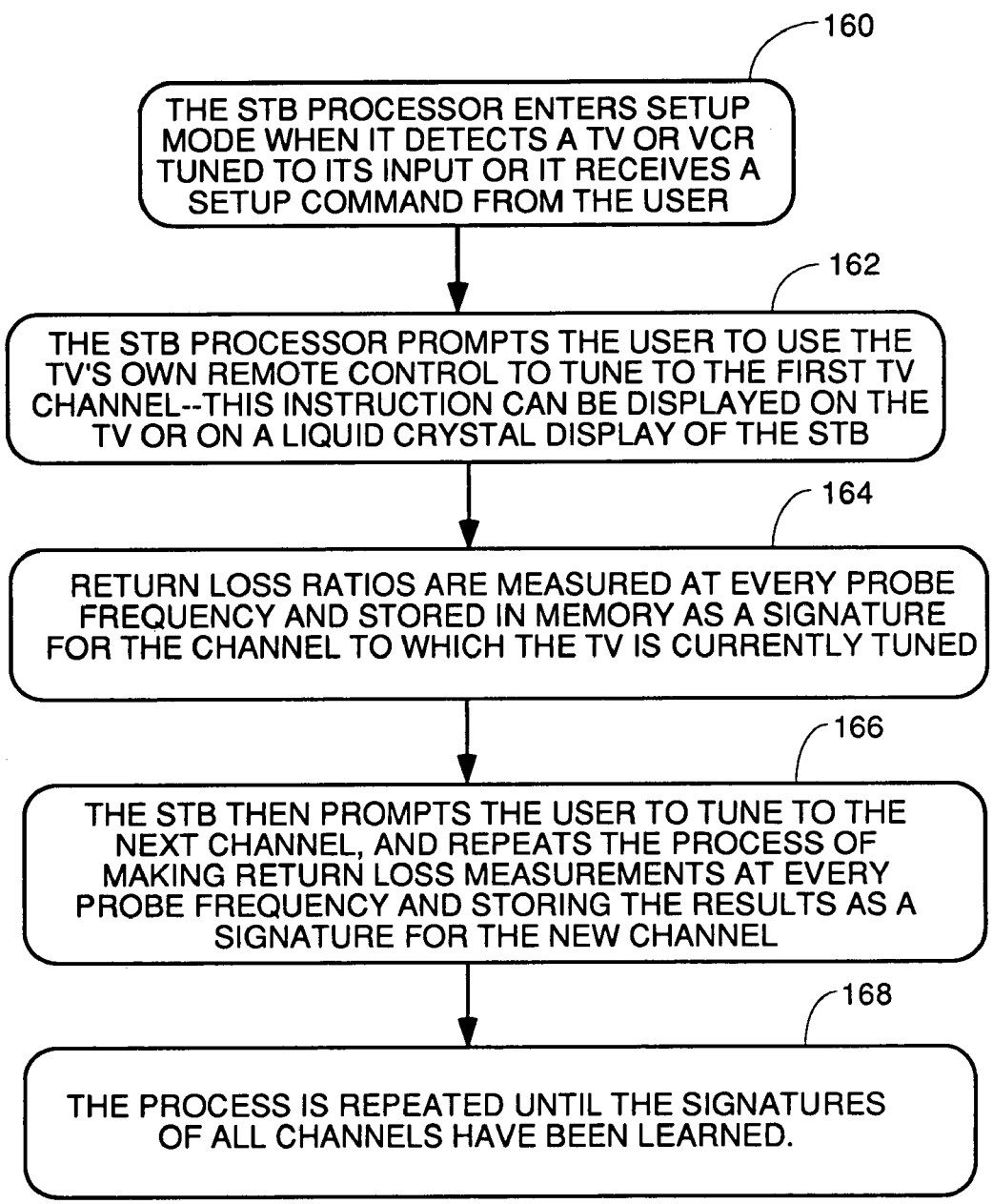
FIG. 9 is a flowchart of a manual setup process.

The setup process can also be done manually. In this process, represented by the flowchart of FIG. 9, the following steps are performed:

1) the STB processor enters setup mode when it detects a TV or VCR tuned to its input or it receives a setup command from the user.

2) the STB processor prompts the user to use the TV's own remote control to tune to the first TV channel—this instruction can be displayed on the TV or on a liquid crystal display of the STB;

3) return loss ratios are measured at every probe frequency and stored in memory as a signature for the channel to which the TV is currently tuned;

4) the STB then prompts the user to tune to the next channel, and repeats the process of making return loss measurements at every probe frequency and storing the results as a signature for the new channel;

5) the process is repeated until the signatures of all channels have been learned.

Figure 10:
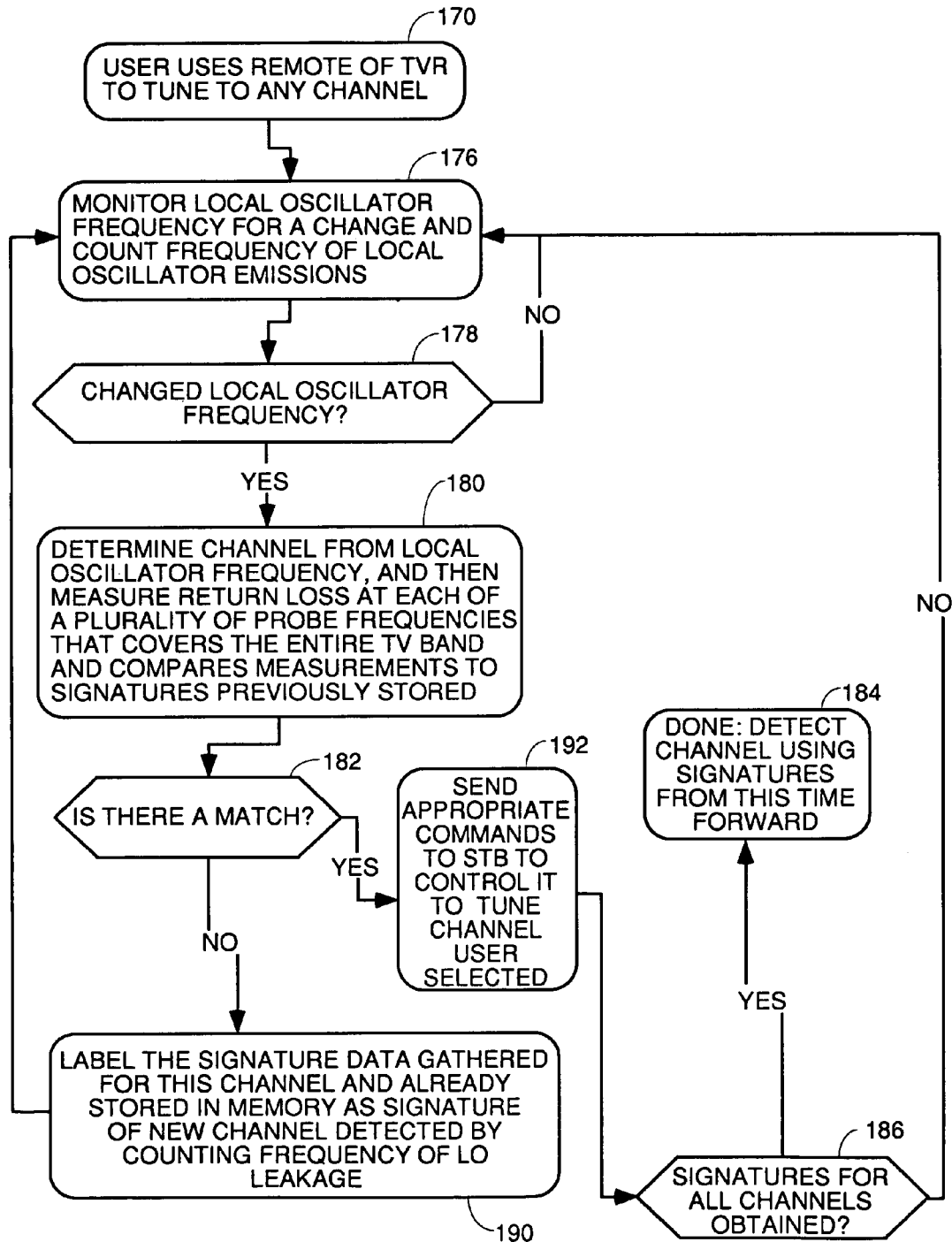
FIG. 10 is a flowchart of a setup process using local oscillator leakage detection for initial detection of the channel and using return loss signatures for channel detection after the signatures are learned.

Another embodiment of the setup process using local oscillator leakage detection for initial detection of the channel and using return loss signatures for channel detection after the signatures are learned is shown in the flowchart of FIG. 10. The advantage of using the process of FIG. 10 is that no setup mode which is apparent to the user is performed. Step 170 represents the user using the remote control that came with the TVR to tune to any channel the user wishes to view. In step 172, the STB detects the local oscillator frequency and draws an inference therefrom as to which channel the TVR is tuned.

In step 174, the STB measures the return loss ratio at each of a plurality of probe frequencies that cover the entire TV band. These return loss ratio measurements are stored as the signature of the TV channel to which the TVR is tuned.

Step 176 represents monitoring the local oscillator frequency for a change. Step 178 compares the frequency count for the current local oscillator leakage to the local oscillator frequency count for the most recent channel to which the TVR was tuned, and determines if the local oscillator frequency has changed by a significant enough amount to indicate the channel has been changed. If no change is detected, processing returns to step 176.

If the local oscillator frequency has changed enough to indicate a channel change has occurred, step 180 is performed. In step 180, the STB measures the return loss at each of a plurality of probe frequencies that cover the entire TV band, and compares the measurement to signatures previously stored. Step 182 determines if there has been a match. If there has been a match, then test 186 determines if all the signatures for all the TV bands have been obtained. If so, step 184 is performed which symbolizes the end of the learning process and the use of the stored signatures and return loss measurements thereafter to determine to which channel the TVR is tuned.

If test 182 determines there is no match between the signature measured in step 180 and the signatures previously stored for other channels, step 188 is performed to detect the local oscillator leakage frequency and draw an inference as to which channel to which the TVR is tuned. Step 190 is then performed to store the signature data gleaned in step 180 as the signature for the channel which step 188 determined the TVR was tuned to. Processing then returns to step 176 to continue to monitor for a change in the local oscillator frequency indicating a channel change has occurred.

FIGS. 10A and 10B are a flowchart of a setup and channel detection process using a combination of local oscillator leakage and return loss ratio signatures. This process has the advantage that there is no separate setup period as signatures are learned as the customer tunes to various channels. If the customer does not tune all channels, only the signatures for the channels the customer tunes are learned. Referring jointly to FIGS. 10A and 10B and FIG. 5, step 170 represents the process of the customer using the remote control for his TV or VCR to select a channel. In step 176, the STB's RF receiver (95 in FIG. 5) is used to detect local oscillator leakage radio frequency emissions from the local oscillator and counts the frequency. Once the frequency count is obtained, the RF receiver 95 looks up the frequency in a lookup table that maps local oscillator frequencies to channels. Step 178 then determines whether the channel to which the TVR is tuned is different from the channel to which it was previously tuned. If not, step 176 is performed to monitor the local oscillator frequency again. If there has been a channel change, the channel that maps to the local oscillator frequency is sent to microprocessor 66. The microprocessor responds in step 180 by looking up the frequency count received from the RF receiver in a table that maps frequency to channel and draws an inference as to which channel the TVR is tuned. The processor then sends a command on data path 106 to return loss channel detector 16 telling it to do the return loss signature learning process, also as symbolized by step 180. The return loss channel detector then performs the process of step 180 by generating a plurality of probe frequencies which span the entire TV band and measures the return loss ratio at each probe frequency. The return loss ratio at each probe frequency is stored in memory, but the collection of return loss ratios is not yet labelled as the signature for the channel to which the TVR is currently tuned because a signature for that channel may have been previously learned.

In step 182, the signature just learned is compared by processor 66 or return loss channel detector 16 to the signatures previously stored in memory for other channels to which the customer has previously tuned. If there is a match, processing proceeds to step 192 where the processor 66 sends the appropriate commands previously described to cause the STB to tune the correct downstream channel on the HFC bearing the MPEG multiplex which has the desired program, and extract the selected program from the MPEG multiplex on that channel. The MPEG packets so extracted are then decrypted and decoded to decompress them back into standard video signals which are then remodulate onto an RF carrier that has the frequency of the channel to which the customer tuned the TVR in step 170. Processor 66 sends a command on data path 106 telling remodulator 102 the frequency of the RF carrier to generate based upon the signature match.

After step 192 is performed, test 186 is performed to determine if a signature has been learned for all the channels available. If so, step 184 symbolizes the process of using the stored signatures for every channel as opposed to the local oscillator leakage to determine the channel to which the TVR is tuned at any particular instant.

If test 182 determines the signature learned in step 180 is a new signature never before learned, step 190 is performed to label the signature data gathered for this channel and stored in memory as the signature for the channel determined from the local oscillator leakage in step 180. Processing then returns to step 176 to monitor for changes in the frequency of the local oscillator frequency leakage emissions.

Figure 11:
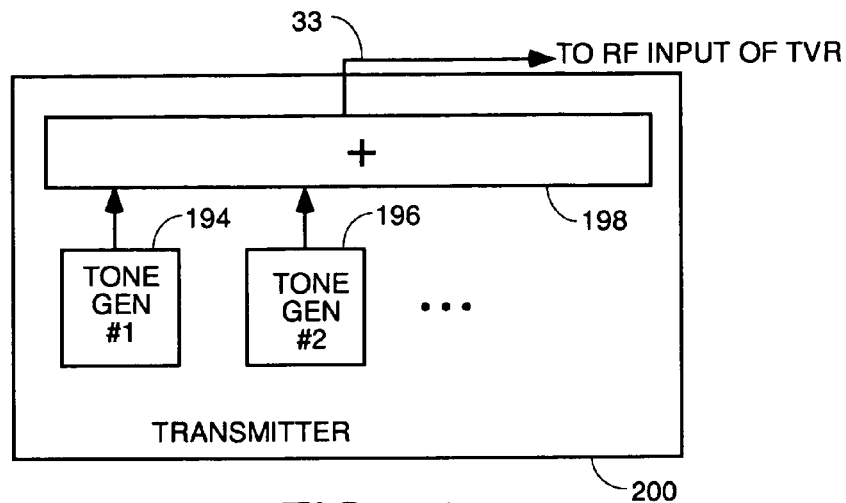
FIG. 11 is a diagram of one species of tone generator for the transmitter part of a return loss detector.

The Preferred Tone Generator and Preferred System for Measuring Return Loss for Channel Detection FIG. 11 is a diagram of one species of tone generator for the transmitter part of a return loss detector. The transmitter 200 needs to supply probe frequencies or tones which span the entire TV channel bandwidth. The receiver of the return loss measurement circuit needs to be able to measure the amplitude of the signal returned from the TVR tuner for each probe frequency, and, in the preferred embodiment, also needs to be able to measure the amplitude of each probe frequency applied to the TVR.

In typical TVR systems, the TV bandwidth is more than 860 MHz. This wide bandwidth presents a difficulty in generating a wide bandwidth signal that spans the entire bandwidth. A more suitable approach is the generate a plurality of independent sinusoidal signals at discrete frequencies (probe signals) the collection of which span the entire bandwidth. In this approach, the return loss is calculated only at discrete frequencies of the probe signals.

FIG. 11 is the transmitter 200 used for this discrete probe signal approach. N probe signals, each at a different frequency are generated by tone generators 194 and 196, etc. The probe signals are summed in summer 198 and applied to the RF input of the TVR. The receiver portion of the return loss measurement circuit has N bandpass filters, each centered on the frequency of one of the N probe signals. In alternative embodiments, a single tunable digital bandpass filter can be used in the receiver and tuned to pass each of the N probe signals one at a time for amplitude measurements. In either embodiment, only the power of the probe frequency is present at the output of the bandpass filter, and the transmitted power of the probe signal is either known or measured. The return loss ratio is then calculated as per equation (2) above. Transmission of the tones may be simultaneous or sequential in various embodiments.

System calibration is needed because the transfer function of the circuitry between output port 33 of the transmitter and input port 32 of the receiver in FIG. 1 varies over frequency regardless of the variations in return loss caused by the TVR. This is caused by frequency dependent gain variation in the transmitter transmission chain, frequency dependent gain variation in the receiver transmission chain, and frequency dependent isolation variation between ports 31 and 36 in FIG. 1.

Because these frequency dependent variations can distort the return loss measurement, a calibration process to remove these variations is performed. This calibration process is performed before the return loss measurement circuit is connected to the TVR. Typically, it is done during the manufacturing process.

The calibration process is done by sending N probe signals or tones at different frequencies that span the TV channel bandwidth to the RF output with the RF output of the transmitter not connected to any TVR and then making a return loss ratio measurement on each probe frequency. The open RF port provides maximum reflection so it represents minimum return loss. N calibration coefficients C(k), one for each probe signal, are calculated according to equation (3) below.

$$C(k) = \frac{1}{\text{abs}(X_{out}(j\omega_k))^2} \tag{3}$$

where $\text{abs}(X_{out}(j\omega_k))^2)$ is the square of the absolute value of the amplitude of the transmitted probe signal.

The calibration coefficient is then used to compensate for the distortion when the actual channel detection is performed. This is done by calculating the calibrated return loss ratio according to equation (4) below.

$$RL_c(j\omega_k) = 10 \log_{10}(C(k)*\text{abs}(X_{out-m}(j\omega))^2) \tag{4}$$

Figure 12:
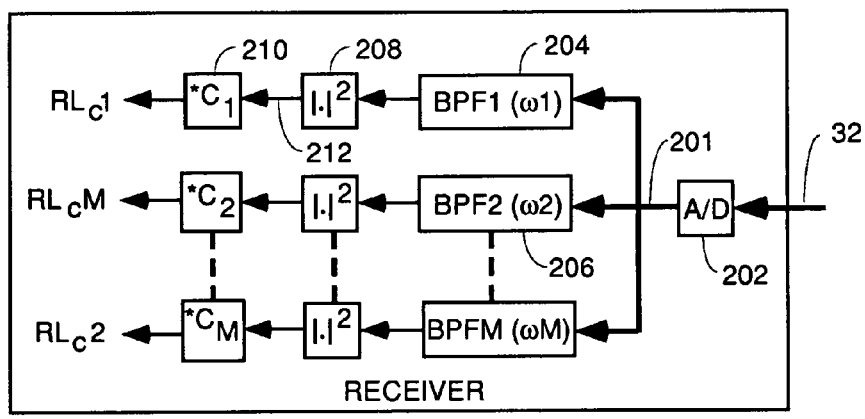
FIG. 12 is a block diagram of a receiver which measures the calibrated return loss is shown.

The structure of a receiver which measures the calibrated return loss is shown in FIG. 12. An analog-to-digital converter 202 digitizes the reflected signal on line 32 from the RF input of the TVR. Individual bandpass filters 204, 206, etc. have passbands each of which is centered on one probe frequency and a passband bandwidth set to filter out substantially all power other than that of the probe signal. Each bandpass filter output is coupled to the input of a circuit (usually implemented as an algorithm in a digital signal processor) like block 208 which calculates the square of the absolute value of the amplitude of the measured signal output from the bandpass filter so as to derive one of the terms $(abs(X_{out-m}(j\omega))^2)$ of equation (4) above. The resulting term is output in digital representation on line 212 and multiplied by the correction factor term C(k) for the particular probe signal involved. Thus, the term output on line 212 for probe signal 1 is multiplied in circuit 210 times the corrector factor for probe signal 1. The circuits of FIG. 12 may be implemented in hardware or in software as algorithms executing one or more digital signal processors.

Tone Generation at High Frequencies

Probe frequencies must be generated at high frequencies throughout the TV channel band. Some embodiments of the transmitter of the return loss detector, such as are symbolized by FIG. 13, use analog mixers that can generate probe signals at high frequencies such as by using a mixer 214 to mix a high frequency local oscillator signal from a crystal local oscillator 212 with a variable frequency input signal from a variable frequency voltage controlled oscillator 216 or direct digital synthesizer. The VCO or DDS 216 has its frequency changed to generate each new probe signal and the mixer steps the frequency on line 218 up in frequency to a frequency somewhere in the TV channel band.

Figures 13, 14:
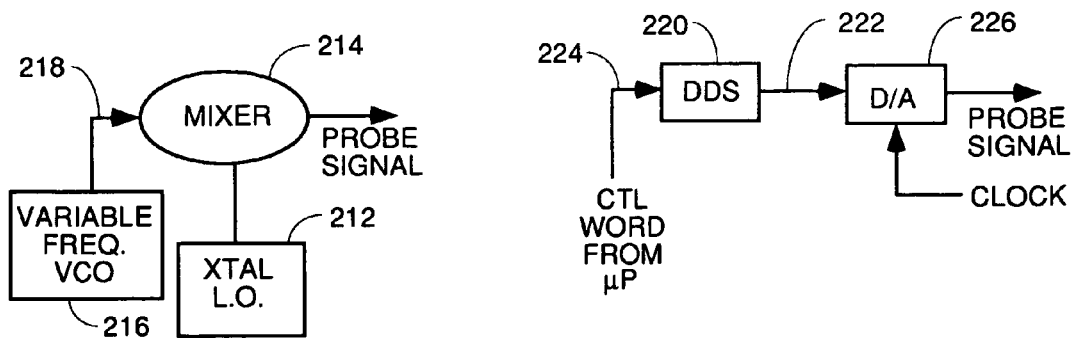
FIG. 13 is a block diagram of an analog tone generator embodiment.
FIG. 14 is another embodiment for a tone generator using a direct digital synthesizer.

FIG. 14 represents another embodiment for a tone generator using a direct digital synthesizer to generate a probe signal on line 222 which has its frequency controlled by a control word on bus 224. A digital-to-analog converter 226 converts the digital output on bus 222 to an analog probe signal. However, to generate a high frequency probe signal at the top of the TV band, the D/A 226 must sample at twice the probe signal frequency to satisfy the Nyquist criteria. That would require a D/A 226 which can sample at 1.72 GHz. Such D/A converters are either not available or hard to interface.

To overcome the need for a fast D/A, the following method and apparatus can be used. The method uses the harmonics generated by the D/A to generate replicas (images) of a basic tone at a desired frequency.

Typical D/A converters use zero order hold (ZOH) methods to construct the discrete samples into analog signals. In ZOH, each discrete sample impulse is held at a constant amplitude for the duration of the sampling interval. The ZOH method results in the following frequency response at the D/A output.

$$DA_{out}(f) = DA_{in}(f) * \left( \frac{\operatorname{Sin}\left(\frac{\pi f}{F_s}\right)}{\frac{\pi f}{F_s}} \right) = DA_{in}(f) * \operatorname{Sinc}\left(\frac{f}{F_s}\right) \quad (5)$$

where $F_s$ is the sampling frequency.

The Sinc function is defined as $$\operatorname{Sinc}(x) = \frac{\operatorname{Sin}(\pi x)}{\pi x},$$

and $DA_{in}(f)$ is the D/A reconstructed signal of an ideal D/A converter where a discrete sample is reconstructed to an impulse (delta) function in time. $DA_{in}(f)$ includes the basic transmitted signal S(f), and identical replicas of this signal which have frequencies which are basically at harmonic frequencies of the sampling frequency, as defined by equation (6) below.

$$DA_{in}(f) = \sum_{k=-\infty}^{\infty} S(f + F_s * k) + S(F_s * k - f) \quad (6)$$

where f is the frequency of the transmitted signal. Thus, when the constructed basic signal $S(t)=\operatorname{Sin}(2\pi ft)$ is a probe signal tone, $DA_{in}$ will include the basic tone and images of the probe signal at frequencies $F_s-f$, $F_s+f$, $2 F_s-f$, ....

$DA_{out}$ will include the same sequence of tones weighted by the function $$\left( \frac{\operatorname{Sin}\left(\frac{\pi f}{F_s}\right)}{\frac{\pi f}{F_s}} \right).$$

Using the replicas generated by the D/A converter, it is possible to generate a tone at a desired frequency $f_d$ even if $F_d > F_s/2$ Typical systems in the prior art have reconstruction low pass filters at the D/A output with a cutoff frequency of $F_s/2$. Such a low pass filter must not be used in the tone generator of the invention. Instead a wide bandwidth low pass filter with a cut off frequency only at the top frequency in the TV channel band, typically 860 MHz.

Figure 15:
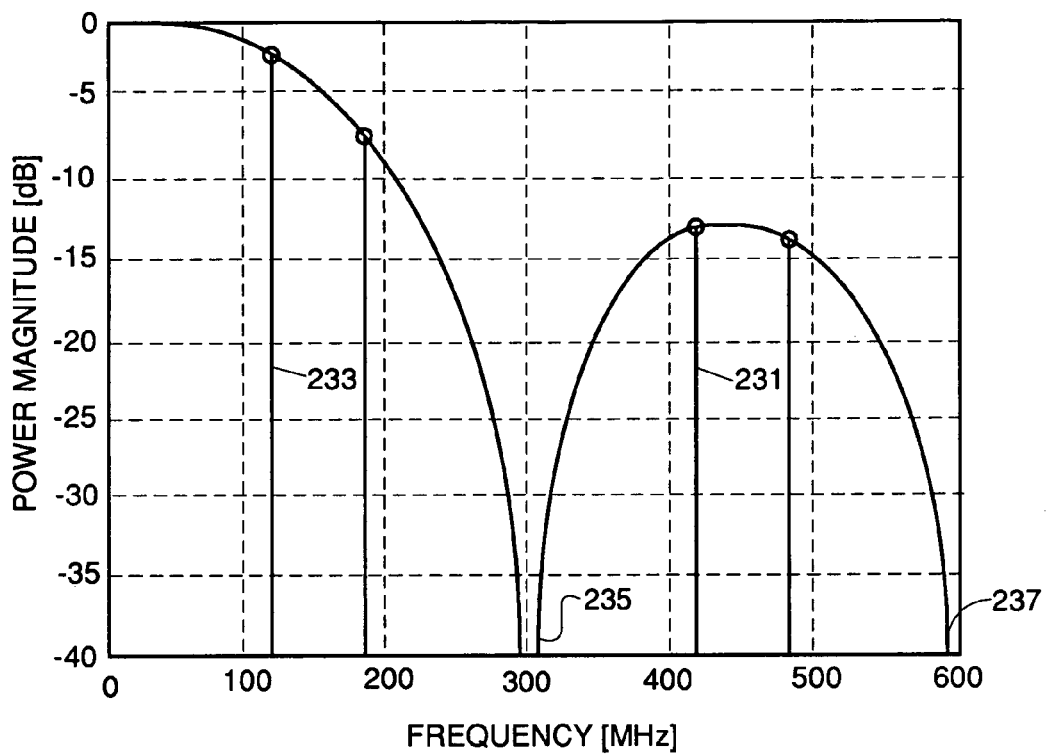
FIG. 15 is a frequency response plot which illustrates the nulls in the power mask of the Sinc function at integer multiples of the sampling frequency when using harmonics to generate the probe frequency.

The frequency mask created by the Sinc function implies that some frequencies have large attenuation, and some frequencies at the null have infinite attenuation. Nulls are created at frequencies which are integer multiples of the sampling frequency $F_s$. Therefore, when selecting a particular sampling frequency, there are some tones which cannot be generated using replicas of the basic frequency. This problem is illustrated in FIG. 15. This figure shows the Sinc function power mask of the D/A output operating at a sample frequency of 300 MHz. In the example of FIG. 15, the desired probe signal frequency is 420 MHz, as shown at 231. The basic frequency is 120 MHz at line 233, and this causes replicas at 180 MHz, 420 MHz, 480 Mhz, etc. as illustrated. Because of the nulls at 300 and 600 MHz, shown at 235 and 237, no probe signals can be generated at the null frequencies.

Figure 16:
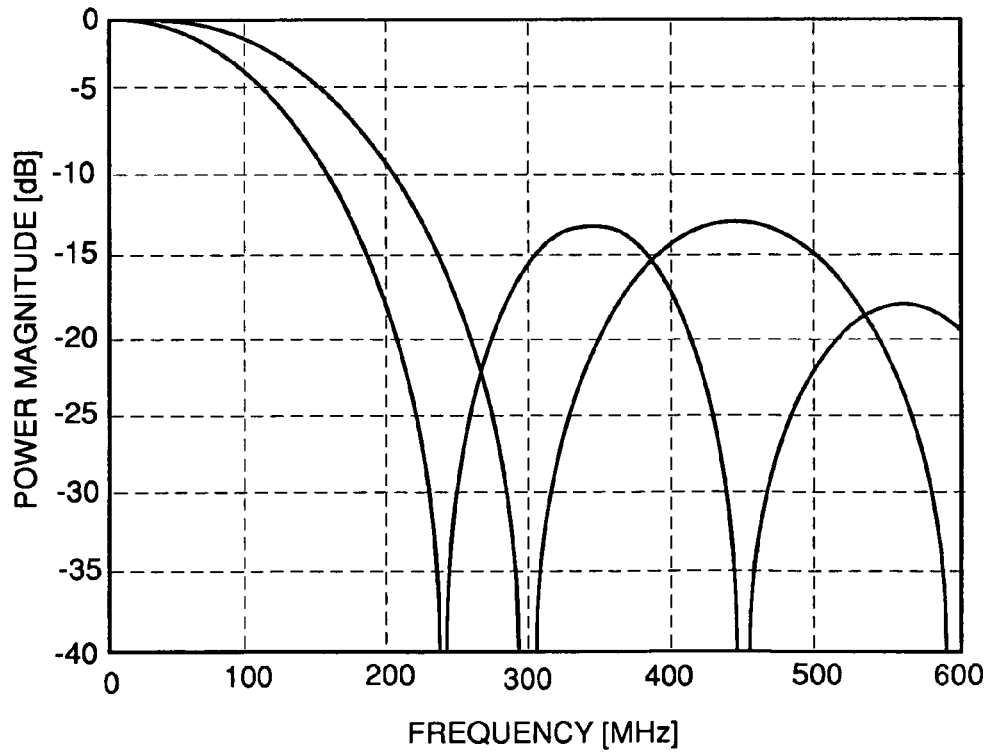
FIG. 16 is a frequency response plot which illustrates the nulls in the power masks of two Sinc functions of different sampling frequencies.

To solve this problem, two D/A sampling frequencies $F_s1$ and $F_s2$ are selected such that the null of the Sinc function of $F_s1$ does not overlap with the null of the Sinc function of $F_s1$, as illustrated in FIG. 16. In FIG. 16, two sampling frequencies at 300 MHz and 230 Mhz are used and the two power masks of the two Sinc functions are illustrated with the nulls not overlapping. The Sinc nulls of the 300 MHz sampling rate at 300 and 600 MHz are covered by high lobes of the 230 MHz sampling frequency Sinc mask. This allows probe frequencies which fall on a null of the $F_s1$ Sinc function to be generated using $F_s2$. Additional sampling frequencies can be used to generate probe frequencies at frequencies where both $F_s1$ and $F_s2$ have nulls or large attenuation.

For each desired probe frequency or tone, several replicas are generated. The channel detector receiver uses a narrow passband filter having its passband centered on the frequency of the desired tone. This passband filter will eliminate the reflected power of undesired tones from the measurement thereby eliminating errors in the return loss measurement from the replicas.

Another issue is the fact that the generated tones have different amplitude, depending upon their frequency relative to the Sinc power mask. The calibration procedure described elsewhere herein compensates for this power variation in the transmitted probe signal.

Figure 17:
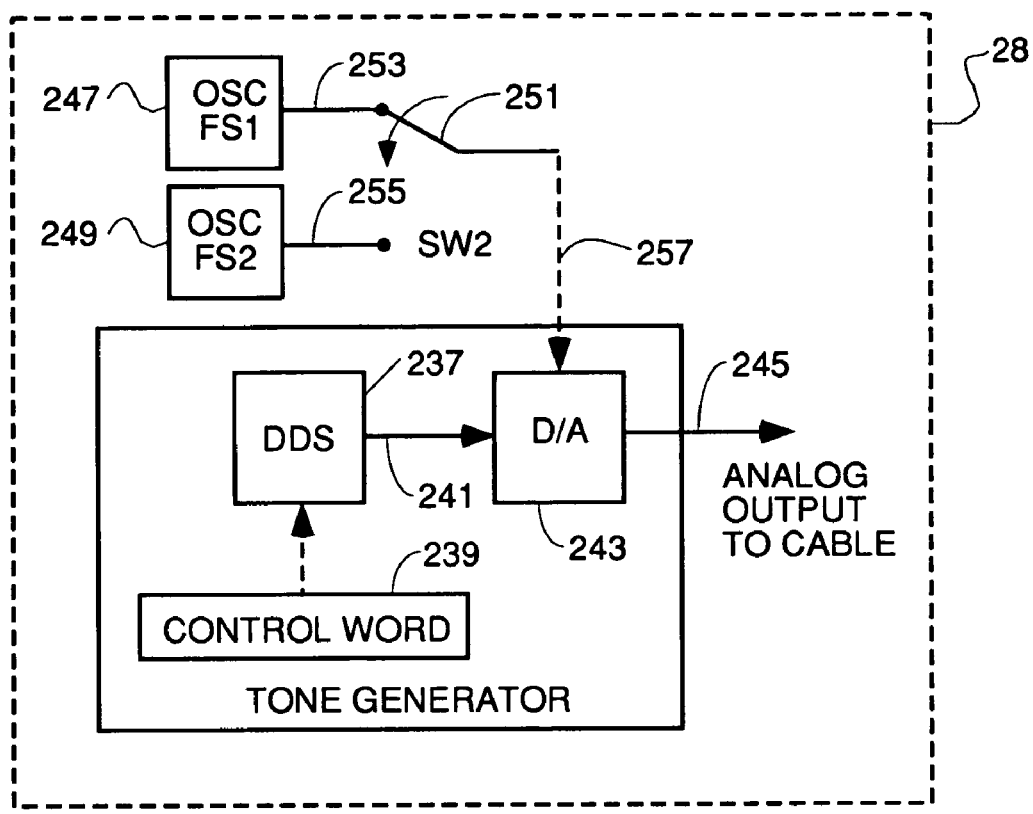
FIG. 17 is a block diagram of a tone generator that uses two sampling frequencies to generate probe signals using harmonic images of the sampling frequency.

FIG. 17 is a block diagram of a tone generator that uses two sampling frequencies to generate probe signals using harmonic images of the sampling frequency. A direct digital synthesizer 237 outputs a digital representation of a base tone on line 241 having a frequency controlled by a digital control word 239 input from a control processor such as processor 66 in FIG. 5. The frequency of the base tone can be controlled by the control word to be any frequency from DC up to the sampling frequency. A D/A converter reconstructs the digital sinusoid on line 241 into an analog fundamental frequency on line 245 using the zero order hold signal reconstruction method which causes replicas of the fundamental to also be output on line 245. Two clocks 247 and 249 generate two different clock frequencies on lines 253 and 255. A switch or multiplexer 251 is controlled by control circuitry such as processor 66 to select the appropriate clock frequency for the desired image frequency to be generated and apply it to the D/A sample clock input 257. The tone generator of FIG. 17 replaces the multiple tone generators 194, 196 etc. in the return loss transmitter of FIG. 11 by suitably controlling the control word 239 and switch 251 to generate each desired probe signal frequency and applying the appropriate calibration factor to each reflected probe signal. In an alternative embodiment, a variable frequency clock such as a voltage controlled oscillator of DDS may be used instead of oscillators 247, 249 and switch 251 so that in case of power mask nulls being a problem, the clock frequency can be slewed to a new sampling frequency to solve the problem.

Detection of the generated probe signals is done using the receiver of FIG. 12. If a tone is present at a frequency that is higher than half the sampling rate of the A/D converter 202, the aliasing property is used. The sampled tone will appear at the A/D output 201 at an aliased digital frequency according to the following formula:

Define $F1 = MODF_s(F_{in})$, then $$F_{out} = F_s - F1 \text{ when } F1 > \frac{F_s}{2} \quad (7)$$

$$\text{when } F1 \leq \frac{F_s}{2}, \text{ then } F_{out} = F1$$

where $F_{in}$ is the input tone frequency, $F_s$ is the sampling rate, and $MODF_s$ is the modulo operation by $F_s$, and $F_{out}$ is the sampled tone frequency which is output by the A/D on line 201.

To detect a tone at frequencies above the Nyquist frequency (half the sampling rate), the receiver shown in FIG. 12 is used, and the bandpass filters 204 each are tuned to one aliased frequency output by the A/D. In other words, each bandpass filter in the receiver is tuned so as to have its passband encompass one of the aliased frequencies $F_{out}$ (as given by equation (7)) of one of the probe signal images having a tone frequency $F_{in}$. Thus, for a given control word 239 in transmitter 28 of FIG. 17, probe signals at three different frequencies plus the fundamental will be generated. To detect the return loss ratio of the reflections of these four probe signals, assume these probe signals have frequencies above the Nyquist frequency. Also, assume the A/D converter 202 in in FIG. 12 is operating at a different sample frequency than the D/A converter 243 in FIG. 17. This is important, because if both the D/A 243 and A/D 202 are operating at the same frequency, the aliasing of the images by the A/D converter 202 collapses the reflections of all images back into one fundamental frequency. It would then be impossible to detect the reflected power of any individual image, and the return loss signature measurement will not be possible. So to measure the reflected power of a probe signal which is a first one of the images of the fundamental, the bandpass filter 204 of the receiver of FIG. 12 has its passband tuned to encompass the frequency $F_{out}$ determined by equation (7) where $F_{in}$ is the frequency of the probe signal which is at the first image frequency of the fundamental. Bandpass filter 206 is then tuned to have its passband encompass the frequency $F_{out}$ determined by equation (7) where $F_{in}$ is the frequency of the probe signal which is at the second image frequency of the fundamental. This process is continued for as many images of the fundamental as there are or as many bandpass filters as their are in the receiver. Then a new fundamental frequency (an a new sample rate if necessary) is picked to generate the next set of probe signals, and the bandpass filters of the receiver are re-tuned to the new set of aliased frequencies output by A/D converter 202 for the new set of images input to the A/D converter on line 32. This process is repeated until the entire TV channel band has been covered by probe signals.

In alternative embodiments, a receiver with a single bandpass filter can be used to measure one aliased probe frequency at a time, and in still other embodiments, a massively parallel receiver with, for example, four hundred channels like those shown in FIG. 12 may be used to measure the reflected power at each probe signal simultaneously.

Figure 18A:
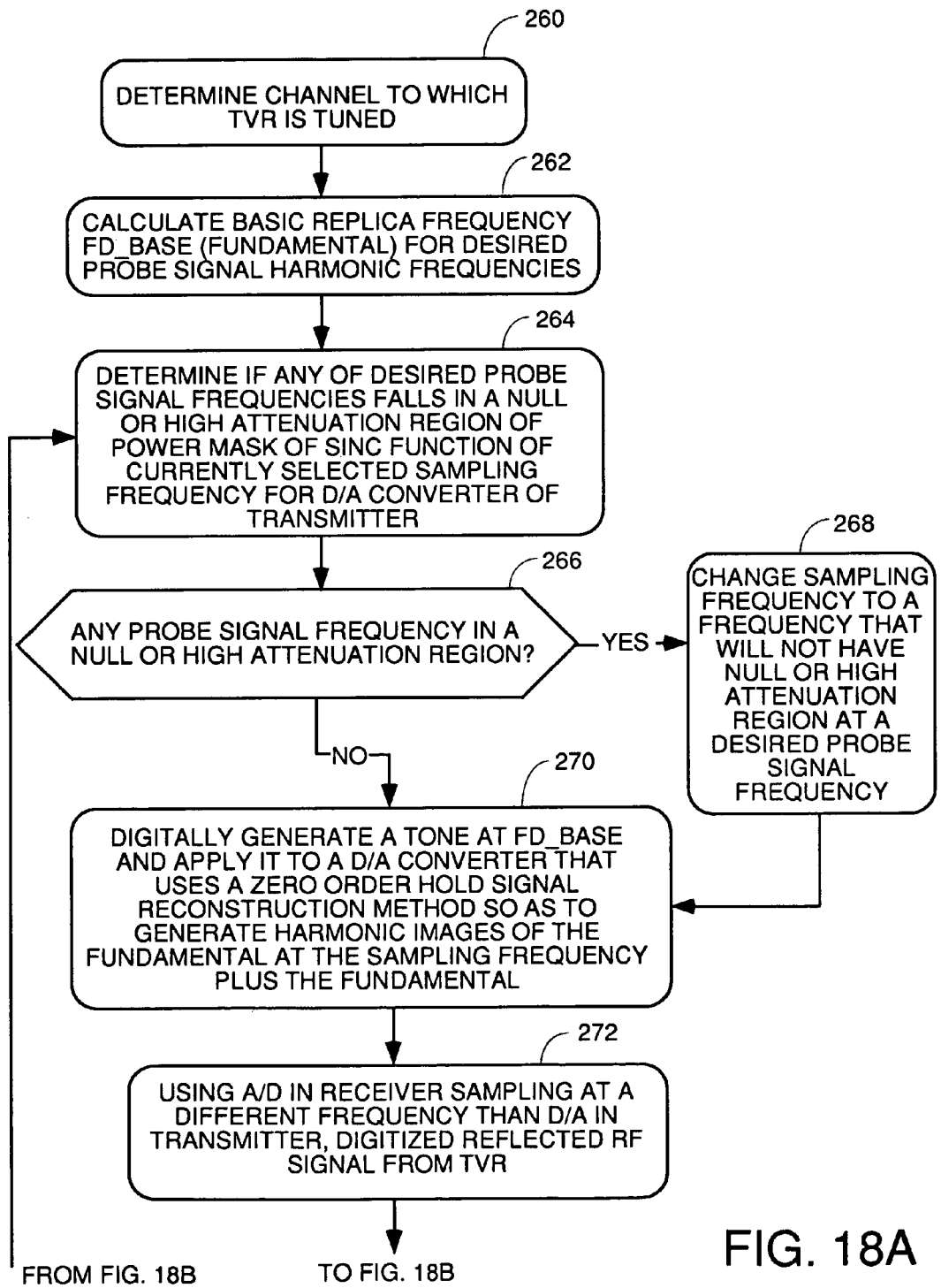
FIGS. 18A and 18B are the preferred method to generate probe signals using harmonics and using these probe signals to measure return losses and store the return losses as a signature.
Figure 18B:
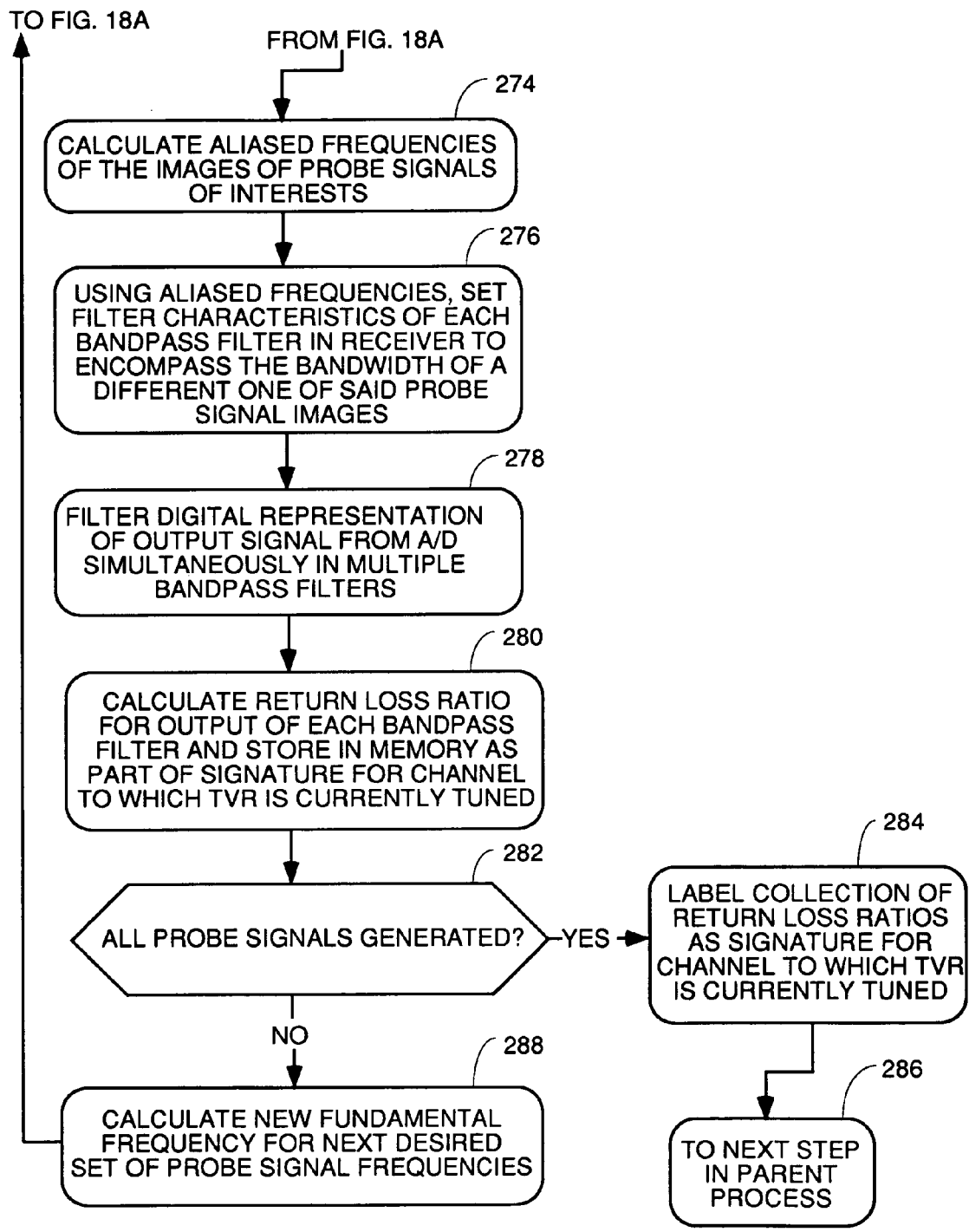

FIGS. 18A and 18B are the preferred method to generate probe signals using harmonics and using these probe signals to measure return losses and store the return losses as a signature. The process of FIGS. 18A and 18B is the preferred method of performing step 180 in FIG. 10 and step 152 in FIG. 8 as part of the two different setup processes disclosed in those figures. For purposes of properly labelling the signature data collected, step 260 is performed to determine the channel to which the TVR is tuned. In the process of FIG. 8 this simply involves reading the data in the message sent to the STB from the TVR remote indicating the selected channel when the remote is used to give a channel selection command to the TVR. In the process of FIG. 10 this is done by drawing an inference from the local oscillator frequency as received from the RF receiver 95 in FIG. 5. Step 262 represents the process of calculating the fundamental frequency $F_{d\_}$base which will be used to generate the harmonic images which will be used as probe signals. The frequency of $F_{d\_}$base is calculated as follows:

1) $F_{d\_}\text{fold} = \text{Modulo}(F_d, F_s)$ 2) if $$F_{d\_}\text{fold} \leq \frac{F_s}{2}$$

then $F_d\_base=F_d\_fold$ 3) else $F_d\_base=F_s-F_d\_fold$.

Step 264 represents the process of determining if any of the harmonic images of the $F_d\_base$ signal generated by applying a fundamental frequency of $F_d\_base$ to the input of the D/A converter will fall in the nulls or high attenuation regions of the power mask of the Sinc function for the currently selected sample frequency $F_s$. Step 266 causes branching to step 268 to change the D/A sampling frequency if one of the probe signal images falls in a null or high attenuation region of the Sinc power mask. The sampling frequency is changed to a frequency which will cause the probe signal image to not fall in a null or high attenuation region of the power mask of the Sinc function for the new sampling frequency. Changing the sampling frequency is accomplished by sending a command to switch 251 in FIG. 17 to cause it to select the other oscillator.

If step 266 determines there is no null problem, step 270 is performed to digitally generate a fundamental at the frequency $F_d\_base$ and apply it to the D/A converter 243 on the output of the transmitter of FIG. 5. This causes harmonic images of the fundamental to be generated in the D/A if it uses zero order hold signal reconstruction, which it does in the invention. These harmonics are at the sampling frequency plus the fundamental, and one or all of them can be used as the probe signals. In the preferred embodiment, all of them are used as probe signals.

The probe signals are then applied to the TVR input and reflections that are frequency dependent and depend upon the channel to which the TVR is currently tuned occur.

In the receiver 18 in FIG. 5, more details of which are shown in FIG. 12, an A/D converter 202 digitizes the reflected frequency components from the TVR. It is important that A/D 202 be sampling at a different sample frequency than the D/A of the transmitter to avoid aliasing the reflected power for individual probe signals back into the fundamental. In other words, unless the sampling frequency for the A/D is different, all the reflected probe signals will be folded into one fundamental aliased frequency component on line 201 and it will not be possible to measure the reflected power of each one individually. Step 272 represents this digitization process by A/D 202.

Step 274 represents the process of calculating the aliased frequency at which each probe signal will appear on line 201 using equation (7). Step 276 uses the aliased frequencies as a guide to adjust the filter characteristics of each bandpass filter 204, 206 in FIG. 12 to have a passband which encompasses a different one of the probe signals. In step 278, the digital representation of the reflected signal on line 201 is simultaneously filtered in each of the bandpass filters. The output of each bandpass filter will then be the reflected power of one probe signal.

In step 280, the return loss ratio is calculated on the output signal from each bandpass filter, as previously described. The results are stored in memory as a part of the signature of the channel to which the TVR is currently tuned. In step 282, a determination is made as to whether all the desired probe signals have been generated. If they have, step 284 is performed to label the collection of return loss ratios as the signature for the channel to which the TVR is currently tuned. Step 286 then symbolizes the completion of the process and transitioning to the next step in the parent process meaning any of the processes described herein to set up the STB and learn signatures. If step 282 determines that not all the probe signals have been generated yet, step 288 is performed to calculate a new fundamental frequency for the next set of desired probe signal frequencies. Processing then transitions back to step 264 and the process continues from there as previously described.

All method claims appended hereto which have a preamble that ends in "steps for:" are to be interpreted in accordance with 35 USC 112, paragraph 6.

Although the preferred and alternative embodiments have been described herein, those skilled in the art will appreciate other alternative embodiments. All such alternative embodiments and other modifications are intended to be included within the scope of the claims appended hereto.

What is claimed is:

1. A return loss channel detector apparatus comprising:
    a directional coupler having an RF output for coupling to an RF input of an analog television or analog video tape recorder (hereafter TVR) and having a transmit input for receiving probe signals and a transmit output at which appears probe signals reflected from said TVR;
    a multiplexer having an output coupled to said transmit input and having a first input for receiving a radio frequency carrier having a video signal modulated thereon and having a second input for receiving probe signals;
    a transmitter for generating probe signals; and
    a receiver for receiving reflected probe signals and calculating a return loss ratio therefrom.

2. The apparatus of claim 1 wherein said transmitter includes means for generating probe signals that have frequencies spread out through a band of frequencies in which TV channels are transmitted.

3. The apparatus of claim 2 wherein said receiver includes means for calculating return loss ratios for all probe signals generated by said transmitter and storing the calculated return loss ratios for each probe signal as a signature for a TV channel to which said TVR is tuned.

4. The apparatus of claim 3 wherein said transmitter further comprises means for calculating a calibration coefficient for each probe signal, and wherein said means for calculating return loss ratios for said probe signal includes means for using the calibration coefficient for each probe signal in making the return loss ratio calculation for said probe signal.

5. The apparatus of claim 1 wherein said transmitter includes a probe signal generator comprising:
    a first clock for generating a first sample frequency and having a clock signal output;
    a second clock for generating a second sample frequency which is different than said first sample frequency and having a clock signal output;
    a multiplexer having first and second inputs coupled to said outputs of said first and second clocks, respectively, and having an output;
    a digital to analog converter (D/A) having a sampling clock signal input coupled to said output of said multiplexer and having a digital signal input and having an output for coupling to said transmit input of said directional coupler, said D/A using a zero order hold process to construct an analog signal from a digital signal representation received at said digital signal input, a direct digital synthesizer having a digital signal output coupled to said digital signal input of said D/A and having a control word input for receiving a control word which controls the frequency of the signal represented digitally by data output on said digital signal output.

6. The apparatus of claim 1 wherein said transmitter includes a probe signal generator comprising:
    a variable frequency clock having a frequency control input and having an output at which a sampling clock signal having a frequency established by a signal received at said frequency control input;

a digital to analog converter (D/A) having a sampling clock signal input coupled to said output of said variable frequency clock, and having a digital signal input and having an output for coupling to said transmit input of said directional coupler, said D/A using a zero order hold process to construct an analog signal from a digital signal representation received at said digital signal input, a direct digital synthesizer having a digital signal output coupled to said digital signal input of said D/A and having a control word input for receiving a control word which controls the frequency of the signal represented digitally by data output on said digital signal output.

7. The apparatus of claim 5 wherein said receiver is comprised of:

an analog to digital converter (A/D) operating on a different sample clock frequency than said D/A, and having an digital signal output;

a plurality of digital signal bandpass filters having filter coefficient inputs;

a control circuit coupled to said bandpass filters to establish filter coefficients for each one which establishes for each bandpass filter a passband which encompasses a reflected probe signal's bandwidth appearing in the digital representation of a reflected signal at said digital signal output of said A/D, each said bandpass filter having an output;

first means coupled to each said output of said bandpass filters for calculating and outputting at a separate output for each bandpass filter the term $abs(X_{out-m}(j\omega k))^2$ where $X_{out-m}$ is the aliased frequency of a probe signal having a frequency $X_{in}$ which the passband of said bandpass filter encompasses;

second means having a separate input coupled to each said separate output of said first means for calculating and outputting a return loss ratio for each probe signal selected by each said bandpass filter using the equation $RL_c(j\omega_k)=10 \log_{10}(C(k)*abs(X_{out-m}(j\omega_k))^2)$.

8. The apparatus of claim 7 wherein said receiver further comprises means for storing signatures for each channel and for using said signatures and return loss ratio measurement to determine a TV channel to which said TVR is tuned and outputting requested channel data indicating the TV channel to which said user has tuned said TVR, and for tracking which TV channel said TVR is tuned over time and altering said requested channel data when the TV channel to which said TVR is tuned has been changed, and further comprising a set top box means coupled to said return loss channel detector apparatus for using said requested channel data output by said return loss channel detector apparatus indicating a desired channel number to be viewed and tuning to a radio frequency carrier modulated with data that encodes a television signal being transmitted on said desired TV channel to which said TVR has been tuned, and for recovering said data and convening said data to a television signal.

9. The apparatus of claim 8 further comprising means in said set top box means for modulating said television signal onto a radio frequency carrier signal at the frequency of said desired channel number and supplying said carrier to an RF output adapted for coupling to an RF input of a TV or VCR.

10. The apparatus of claim 8 wherein said set top box means includes means to use said requested channel data to determine if a conditional access key is needed for said selected channel, and, if so, send an upstream DOCSIS message requesting the necessary session key, and for receiving a downstream message containing the requested session key, and for decrypting said session key using a secret user key, and using said decrypted session key to decrypt a working key transmitted with the data of the requested channel and using said decrypted working key to decrypt data of said requested channel.

11. The apparatus of claim 10 further comprising an infrared transceiver and setup means for using said infrared transceiver to complete a setup process to use said return loss channel detector to learn said signature of every TV channel to which a tuner in said TVR coupled to said return loss channel detector apparatus is tuned.

12. The apparatus of claim 11 wherein said set top box means includes a radio frequency receiver coupled to a control processor and wherein said setup means functions to use said radio frequency receiver and processor to receive a radio frequency command indicating the channel to which a TVR tuner has been tuned during said setup process, said radio frequency command sent from a remote control used during said setup process to change channels to which a tuner of a TVR is tuned.

13. A process for determining if an analog TV or VCR (hereafter TVR) is tuned to a particular TV channel, comprising the steps:

(1) generating one or more probe signals having frequencies within the passband or some of which are within and some of which are without the passband of a tunable bandpass filter within a tuner of a TVR when said TVR is tuned to a particular TV channel;

(2) transmitting said probe signals to an RF tuner input of said TVR and coupling reflected power back to an input of a receiver;

(3) in said receiver calculating a return loss ratio and determining therefrom whether said TVR is tuned to said particular TV channel.

14. The process of claim 13 wherein step 1 comprises generating a plurality of probe signals having frequencies that are spread throughout the entire TV channel band, and wherein step 2 comprises transmitting a plurality of probe signals to said TVR simultaneously, and wherein step 3 comprises setting filter coefficients for each of a plurality of bandpass filters in said receiver such that said bandpass filter has a passband which encompasses the frequency at which a different one of said probe signals appears at the input to said bandpass filter, and calculating a return loss ratio on the output signal from each said bandpass filter.

15. The process of claim 14 further comprising the step of calculating a calibration coefficient for each probe signal frequency and using said calibration coefficient for each probe signal frequency in a calculation of a return loss ratio for said probe signal to compensate for frequency dependent variations that affect the probe signals.

16. The process of claim 15 wherein step 1 comprises the steps of:

calculating the frequency of a basic replica frequency which will yield a plurality of replica images at higher frequencies when a digital representation of said basic replica frequency is converted to an analog signal by a digital to analog converter (D/A) operating using a zero order hold method to construct an analog signal from discrete samples;

generating a digital representation of said basic replica frequency and applying same to a digital input of a D/A operating using a zero order hold method so as to generate a plurality of analog probe signals at an output of said D/A.

17. The process of claim 15 wherein step 1 comprises the steps of:
- calculating the frequency of a basic replica frequency which will yield a plurality of replica images at higher frequencies when a digital representation of said basic replica frequency is converted to an analog signal by a digital to analog converter (D/A) operating using a zero order hold method to construct an analog signal from discrete samples;
- calculating a Sine function power mask for the sampling frequency of said D/A;
- determining if one or more desired probe signals to be generated as replica images of said basic replica frequency have frequencies in nulls or high attenuation regions of said power mask;
- if one or more desired probe signals to be generated as replica images of said basic replica frequency have frequencies in a null or high attenuation region of said power mask, changing the sampling frequency of said D/A such that the Sinc function power mask of the new sampling frequency does not have a null or high attenuation region at the frequency of any desired probe signal;
- generating a digital representation of said basic replica frequency and applying same to the digital input of a D/A operating using a zero order hold method so as to generate a plurality of analog probe signals at an output of said D/A.

18. A process for using return loss to verify a TV channel to which a TVR is tuned, comprising the steps:
1) detecting a local oscillator leakage signal and counting the frequency thereof and using said frequency to lookup a TV channel to which a TVR is tuned which would cause said local oscillator to have said frequency;
2) generating and transmitting into an RF input of said TVR a plurality of probe signals having frequencies spread through a band of frequencies in which TV channels are transmitted;
3) determining the transmitted power of each probe signal;
4) measuring the reflected power of each probe signal;
5) calculating the return loss ratio for each probe signal;
6) determining the probe signal with the maximum return loss;
7) determine the TV channel whose frequency has the best match with the probe signal which suffered the highest return loss;
8) determining if the TV channel determined in step 7 is the same as the TV channel determined in step 1;
9) if step 8 determines the TV channels are different, use the TV channel determined in step 7 and generate suitable control signals for use by a set top decoder to tune to a downstream channel carrying the TV channel determined in step 7 and recover the data thereof and convert said data to a television signal and modulate an RF carrier having the frequency of the TV channel determined in step 7 with said television signal;
10) if step 8 determines the TV channels are the same, use the TV channel determined in steps 7 and 1 and generate suitable control signals for use by a set top decoder to tune to a downstream channel carrying the TV channel determined in step 7 and recover the data thereof and convert said data to a television signal and modulate an RF carrier having the frequency of the TV channel determined in step 7 with said television signal.

19. A process for using return loss to determine a TV channel to which a TVR is tuned, comprising the steps:
1) performing a setup process to learn the signature of each TV channel comprised of the return loss ratios of a plurality of probe signals which have frequencies spread throughout the TV channel band, and storing the signature for each TV channel;
2) determining the TV channel to which a TVR is currently tuned by performing the following steps:
3) generating a plurality of probe signals having frequencies which are spread through the band of frequencies in which TV channels are transmitted and transmitting said probe signals into the RF input of a tuner of a TVR;
4) calculating the return loss ratio on each probe signal;
5) comparing the collection of return loss ratios and comparing the collection of return loss ratios to the signature stored in memory for each TV channel and determining the TV channel have the least difference between its signature and said collection of return loss ratios calculated in step 4; and
6) generating suitable control signals to control a set top decoder to tune to a downstream channel carrying the TV channel determined in step 5 and recover the data thereof and convert said data to a television signal and modulate an RF carrier having the frequency of the TV channel determined in step 5 with said television signal.

20. A setup process for learning the return loss ratio signature of each TV channel comprising steps for:
1) establishing the proper infrared protocol for at least channel change commands to be emitted from an infrared transmitter;
2) entering a learning mode;
3) transmitting a channel change command from said infrared transmitter to cause a TVR connected to a set top decoder with a return loss ratio channel detection circuit therein to tune to a specific channel;
4) controlling said return loss ratio channel detection circuit to generate a plurality of probe signals and transmit them into the RF input of a tuner in said TVR;
5) measure the reflected amplitude of each said probe signal and calculate a return loss ratio therefor and store the collection of return loss ratios as a signature for the TV channel to which the TVR is currently tuned;
6) transmitting channel change command from said infrared transmitter to cause said TVR to change to a new channel;
7) repeating steps 4 and 5 for the new channel;
8) repeating steps 6 and 7 until a signature has been learned for every TV channel.

21. A setup process for learning the return loss ratio signature of each TV channel comprising steps for:
1) establishing the proper infrared protocol for at least channel change commands to be emitted from an infrared transmitter in an external remote control for a set top decoder (STB), said external remote control including an RF transmitter for communicating with an RF receiver in said STB, said STB including a return loss ratio channel detection circuit therein having an RF output for coupling to the RF input of a tuner of a TVR;
2) entering a learning mode;
3) transmitting a channel change command from said infrared transmitter in said external remote control to cause said TVR connected to said return loss ratio channel detection circuit to tune to a specific channel, and sending a radio frequency message to said STB telling said STB to which TV channel said TVR has just been tuned;
4) controlling said return loss ratio channel detection circuit to generate a plurality of probe signals and transmit them into said RF input of said tuner in said TVR;
5) measuring the reflected amplitude of each said probe signal and calculate a return loss ratio therefor and store the collection of return loss ratios as a signature for the TV channel to which the TVR is currently tuned;

6) transmitting channel change command from said infrared transmitter in said external remote control to cause said TVR to change to a new channel;

7) repeating steps 4 and 5 for the new channel;

8) repeating steps 6 and 7 until a signature has been learned for every TV channel.

22. A setup process for learning the return loss ratio signature of each TV channel comprising steps for:

1) transmitting a channel change command to a TVR using a remote control of said TVR so as to tune said TVR to a selected TV channel;

2) periodically or occasionally monitoring leakage from a local oscillator in a tuner of said TVR to determine the frequency at which said local oscillator is oscillating;

3) determining if the current frequency at which said local oscillator is oscillating has changed since the last time the frequency of said local oscillator was counted;

4) if the frequency of said local oscillator has not changed since the last time it was checked, return to step 2, but if the frequency of said local oscillator has changed since the last time it was checked, using the frequency of said local oscillator to determine the channel to which said TVR is tuned and then learn the return loss ratio signature of said TV channel to which said TVR is tuned and store said signature in memory;

5) determine if there is a match between the signature stored in step 4 and signatures previously stored;

6) if step 5 determines there is a match, generating and sending the appropriate commands to control a set top decoder to tune to a downstream channel carrying the TV channel determined in step 5 and recover the data thereof and convert said data to a television signal and modulate an RF carrier having the frequency of the TV channel determined in step 5 with said television signal, 7) determining if all signatures for all channels have been learned, and, if so, thereafter using said signatures in conjunction with return loss ratio measurements on a plurality of probe signals to determine the channel to which a TVR is tuned at any particular time, but if not all signatures have been learned, returning to step 2;

8) if step 5 determines that the signature learned in step 4 does not match any signature previously learned, labeling the signature data gathered in step 4 as the signature for the channel determined in step 4, and then returning to step 2.

* * * * *